(12) United States Patent
Huppi et al.

(10) Patent No.: US 9,891,738 B2
(45) Date of Patent: Feb. 13, 2018

(54) ULTRASOUND-BASED FORCE SENSING OF INPUTS

(71) Applicant: Apple Inc., Cupertino, CA (US)

(72) Inventors: Brian Q. Huppi, Cupertino, CA (US); Martin P. Grunthaner, Cupertino, CA (US); John G. Elias, Cupertino, CA (US); Sinan Filiz, Cupertino, CA (US); Steven P. Hotelling, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/742,500

(22) Filed: Jun. 17, 2015

(65) Prior Publication Data
US 2016/0062530 A1 Mar. 3, 2016

Related U.S. Application Data

(63) Continuation of application No. 14/417,162, filed as application No. PCT/US2013/032366 on Mar. 15, 2013, now abandoned.
(Continued)

(51) Int. Cl.
G06F 3/041 (2006.01)
G06F 3/043 (2006.01)
(Continued)

(52) U.S. Cl.
CPC ............ *G06F 3/0414* (2013.01); *G06F 3/023* (2013.01); *G06F 3/043* (2013.01); *G06F 3/0412* (2013.01);
(Continued)

(58) Field of Classification Search
None
See application file for complete search history.

(56) References Cited

U.S. PATENT DOCUMENTS 4,526,043 A   7/1985   Boie et al.
4,964,302 A   10/1990  Grahn et al.
(Continued)

FOREIGN PATENT DOCUMENTS

CN   1740958     3/2006
CN   101458606   6/2009
(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Seokyun Moon
(74) *Attorney, Agent, or Firm* — Brownstein Hyatt Farber Schreck, LLP

(57) ABSTRACT

An electronic device that senses home button inputs through ultrasonic force sensing. The electronic device may correlate that amount of force that a user applies to the home button with a specific home button command. In certain embodiments, the system may combine the force of touch information with other information that is sensed for a particular touch to correlate the touch input with a greater number of home button commands. A home button embodiment discussed herein may include a home button image that is displayed on a touch sensitive panel. In other embodiments, a home button may be located outside of the boundaries of a touch sensitive panel.

20 Claims, 20 Drawing Sheets

Related U.S. Application Data

(60) Provisional application No. 61/676,306, filed on Jul. 26, 2012.

(51) Int. Cl.
*G06F 3/023* (2006.01)
*G06F 3/0488* (2013.01)

(52) U.S. Cl.
CPC .......... *G06F 3/0416* (2013.01); *G06F 3/0488* (2013.01); *G06F 3/04886* (2013.01); *G06F 2203/04106* (2013.01); *G06F 2203/04808* (2013.01)

(56) References Cited

U.S. PATENT DOCUMENTS

| | | | |
|---|---|---|---|
| 5,209,126 | A | 5/1993 | Grahn |
| 5,673,041 | A * | 9/1997 | Chatigny ............... H03K 17/94 178/18.04 |
| 5,854,450 | A | 12/1998 | Kent |
| 6,888,536 | B2 | 5/2005 | Westerman et al. |
| 7,331,245 | B2 | 2/2008 | Nishimura et al. |
| 7,629,966 | B2 | 12/2009 | Anson |
| 8,169,332 | B2 | 5/2012 | Son |
| 8,289,290 | B2 | 10/2012 | Klinghult |
| 8,423,089 | B2 | 4/2013 | Song et al. |
| 8,471,824 | B2 | 6/2013 | Kim et al. |
| 8,570,162 | B2 | 10/2013 | Ujii et al. |
| 8,570,297 | B2 | 10/2013 | Bulea et al. |
| 8,633,916 | B2 | 1/2014 | Bernstein et al. |
| 8,648,816 | B2 | 2/2014 | Homma et al. |
| 8,674,947 | B2 | 3/2014 | Henderson et al. |
| 8,711,122 | B2 | 4/2014 | Wada et al. |
| 8,711,128 | B2 | 4/2014 | Small et al. |
| 8,730,199 | B2 | 5/2014 | Sleeman et al. |
| 8,803,848 | B2 | 8/2014 | Suarez Rovere |
| 9,024,886 | B2 | 5/2015 | Doi et al. |
| 9,024,907 | B2 | 5/2015 | Bolender |
| 9,063,593 | B2 | 6/2015 | Schneider et al. |
| 9,127,999 | B2 | 9/2015 | Tsuruno |
| 9,262,002 | B2 | 2/2016 | Momeyer et al. |
| 2001/0023204 | A1 | 9/2001 | Komata |
| 2006/0244733 | A1 | 11/2006 | Geaghan |
| 2008/0185281 | A1 * | 8/2008 | Chang .................... G06F 3/0202 200/5 A |
| 2008/0198145 | A1 * | 8/2008 | Knowles ................. G06F 3/043 345/177 |
| 2009/0019949 | A1 | 1/2009 | Rothkopf et al. |
| 2009/0160808 | A1 * | 6/2009 | Wu ..................... G06F 3/03547 345/173 |
| 2009/0228791 | A1 | 9/2009 | Kim et al. |
| 2009/0309616 | A1 * | 12/2009 | Klinghult ................ G06F 3/044 324/686 |
| 2010/0066697 | A1 | 3/2010 | Jacomet et al. |
| 2010/0079382 | A1 * | 4/2010 | Suggs ................... G06F 3/0416 345/173 |
| 2010/0123686 | A1 | 5/2010 | Klinghult et al. |
| 2011/0012760 | A1 | 1/2011 | Klinghult |
| 2011/0095919 | A1 | 4/2011 | Ostermoeller et al. |
| 2011/0199342 | A1 | 8/2011 | Vartanian et al. |
| 2011/0254762 | A1 * | 10/2011 | Dahl ..................... G06F 3/0346 345/156 |
| 2012/0086666 | A1 | 4/2012 | Badaye et al. |
| 2012/0105358 | A1 * | 5/2012 | Momeyer ............. G06F 3/0414 345/174 |

FOREIGN PATENT DOCUMENTS

| | | |
|---|---|---|
| EP | 1840715 | 10/2007 |
| EP | 2141566 | 1/2010 |
| WO | WO 11/024457 | 3/2011 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

Bantz, "Keyboard Device for Upper and Lower Case Keying Without Shifting," IBM Technical Disclosure Bulletin, International Business Machines Corp. (Thornwood, vol. 21, No. 9, 1979, pp. 3845-3846.

\* cited by examiner

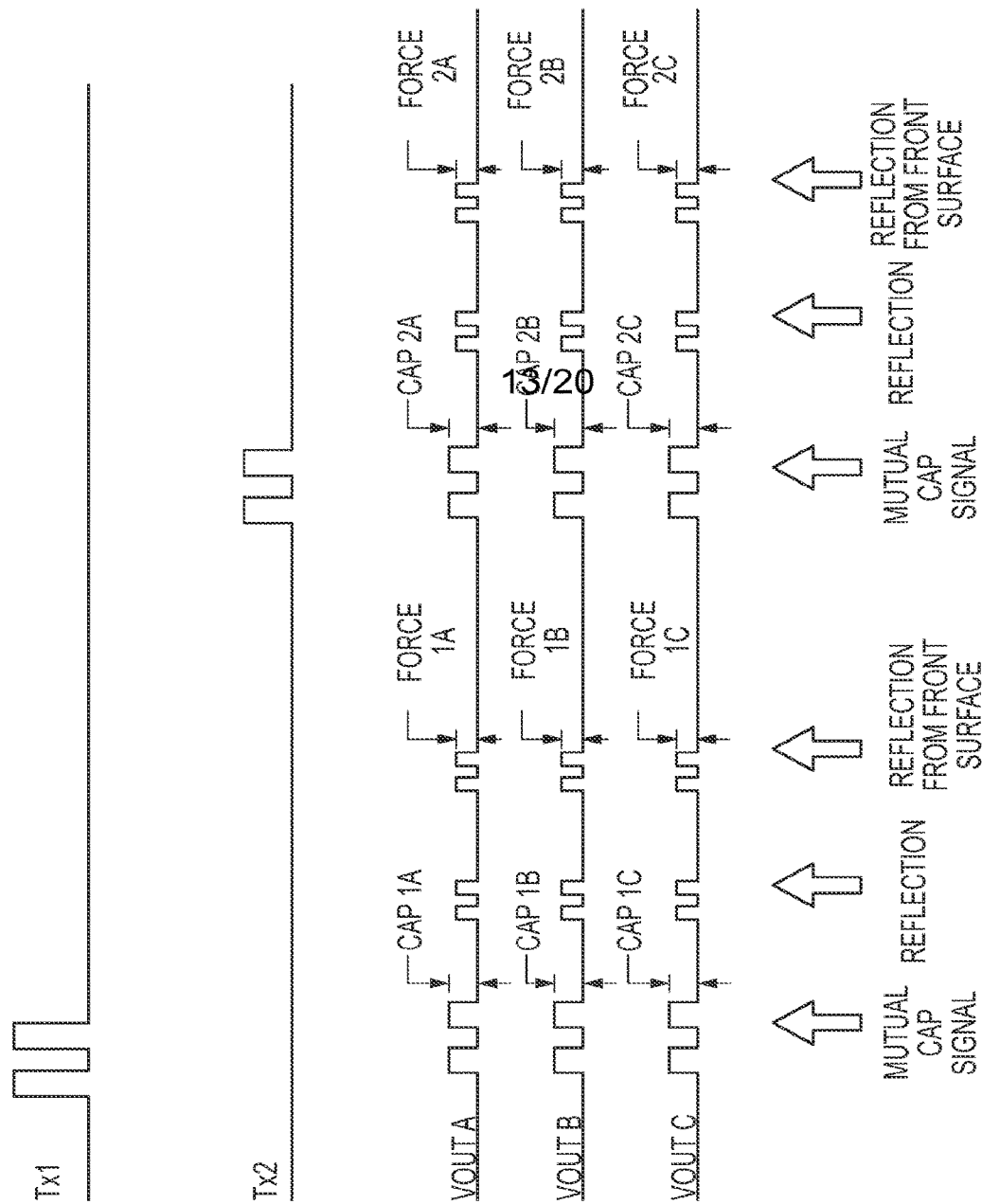

ULTRASOUND-BASED FORCE SENSING OF INPUTS

CROSS REFERENCE TO RELATED APPLICATIONS

This application is a continuation of U.S. patent application Ser. No. 14/417,162, filed Jan. 25, 2015, and entitled "Ultrasound-Based Force Sensing of Inputs," which is a 35 U.S.C. § 371 application of PCT/US2013/032366, filed Mar. 15, 2013, and entitled "Ultrasound-Based Force Sensing of Inputs," and further claims the benefit under 35 U.S.C. § 119(e) to U.S. Provisional Application No. 61/676,306, filed Jul. 26, 2012, and entitled, "Ultrasound Based Force Sensing of Inputs," all of which are incorporated by reference as if fully disclosed herein.

TECHNICAL FIELD

This application generally relates to force sensing on touch devices using ultrasound.

BACKGROUND

Some electronic devices allow a user to enter a number of different commands into the electronic device through a single button, called the home button. In these devices, pressing the home button may shift the electronic device between various modes of operation. Typically, a home button is a mechanical button that recognizes two states: pressed and not pressed. Using the home button, the device may recognize a number of different commands that correspond to the way in which a user presses the home button. For example, pressing the home button for a short duration may indicate a first command, while pressing the home button for a longer duration may indicate a second command. By way of further example, pressing the home button in rapid succession may indicate a third command.

Because these methods of indicating commands allow only a relatively small number of commands to be entered, the functionality of the home button can be relatively limited. Accordingly, in order to expand the functionality of the home button, it would be advantageous to distinguish among a greater number of different ways in which a user presses the home button. In other respects, there is an need to implement the home button functionality without the use of a mechanical button. Because some electronic devices receive other inputs through a touch screen, the use of a mechanical button adds an input mechanism of a different type. Thus, it would be advantageous to implement the home button using a same or similar mechanism that is used to implement the touch screen so that the complexity of the device is reduced. These and other needs are addressed by the following disclosure.

SUMMARY

Examples of embodiments described herein may take the form of an electronic device that senses home button inputs through ultrasonic force sensing. The electronic device may correlate that amount of force that a user applies to the home button with a specific home button command. In certain embodiments, the system may combine the force of touch information with other information that is sensed for a particular touch to correlate the touch input with a greater number of home button commands. A home button embodiment discussed herein may include a home button image that is displayed on a touch sensitive panel. In other embodiments, a home button may be located outside of the boundaries of a touch sensitive panel. One example embodiment may take the form of a force-sensitive device having: a non-mechanical, non-depressible button; an ultrasound-based force-sensing element underlying the button with respect to a bottom surface of the device; and a processor operative to receive force data from the force-sensing element and interpret the force data as a command associated with the button; wherein the command varies based on a force applied to the button across a continuum of magnitudes. Another sample embodiment may take the form of a method for determining and responding to an input force, comprising: ultrasonically sensing a force exerted on an input element of an electronic device, the input element being non-depressible and non-mechanical; determining a magnitude of the force; correlating the force to an input command, the correlated input command chosen from a non-binary set of possible input commands based on a magnitude of the force exerted on the input element; and executing the input command.

BRIEF DESCRIPTION OF THE DRAWINGS

FIG. 8B shows a conceptual drawing of a system including ultrasound-based sensing with integrated touch modules, including signals associated with row drivers and sense columns;

SPECIFICATION

Figure 1A:
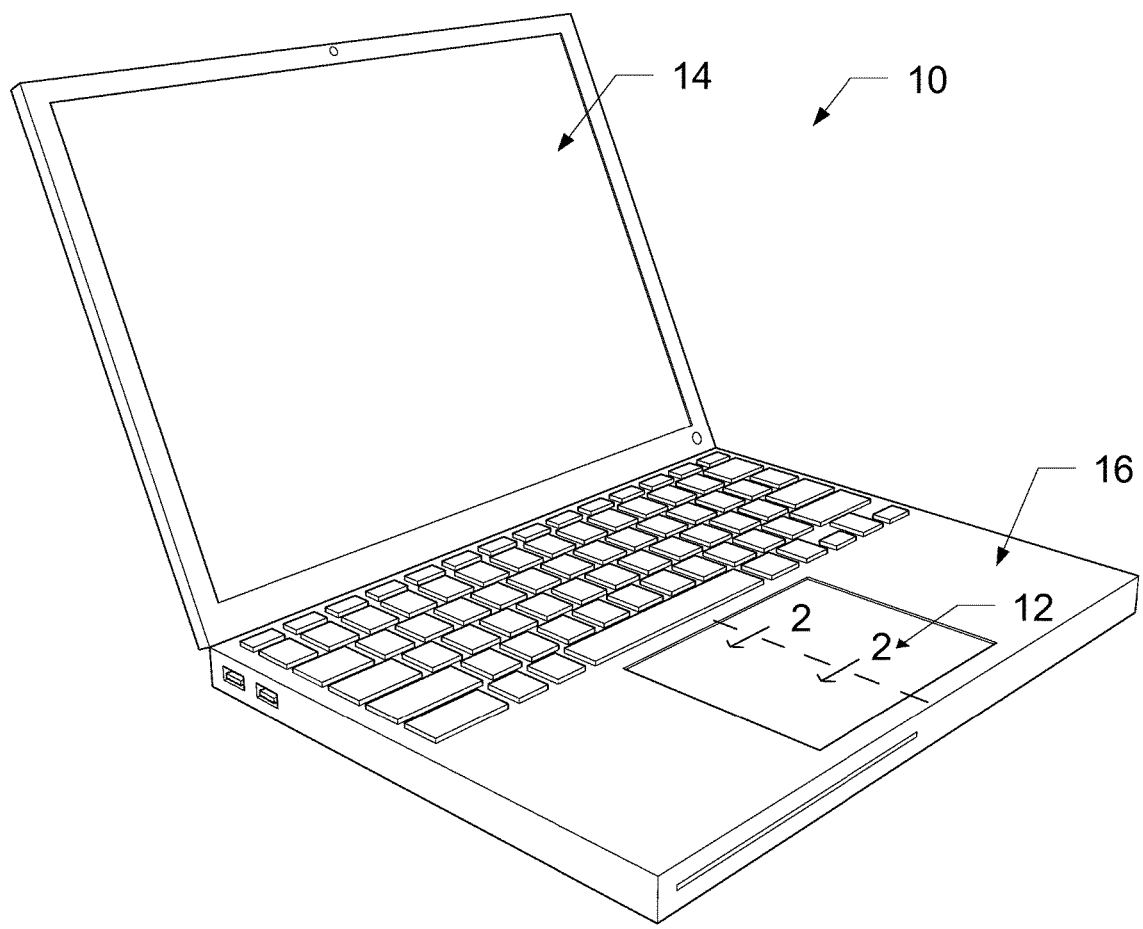
FIG. 1A is a front perspective view of a first example of a computing device incorporating a force sensing device.

This disclosure relates generally to an electronic device that senses home button inputs through ultrasonic force sensing. The electronic device may correlate that amount of force that a user applies to the home button with a specific home button command. In certain embodiments, the system may combine the force of touch information with other information that is sensed for a particular touch to correlate the touch input with a greater number of home button commands. A home button embodiment discussed herein may include a home button image that is displayed on a touch sensitive panel. In other embodiments, a home button may be located outside of the boundaries of a touch sensitive panel.

The following terminology is exemplary, and not intended to be limiting in any way.

The text "touch sensing element", and variants thereof, generally refers to one or more data sensing elements of any kind, including information sensed with respect to individual locations. For example and without limitation, a touch sensing element can sense data or other information with respect to a relatively small region of where a user is contacting a touch device.

The text "force sensing element", and variants thereof, generally refers to one or more data sensing elements of any kind, including information sensed with respect to force-of-touch, whether at individual locations or otherwise. For example and without limitation, a force sensing element can sense data or other information with respect to a relatively small region of where a user is forcibly contacting a device.

The text "force-of-touch", and variants thereof, generally refers to a degree or measure of an amount of force being applied to a device. The degree or measure of an amount of force need not have any particular scale; for example, the measure of force-of-touch can be linear, logarithmic, or otherwise nonlinear, and can be adjusted periodically (or otherwise, such as aperiodically or otherwise from time to time) in response to one or more factors, either relating to force-of-touch, location of touch, time, or otherwise.

The above statements of terminology would be applicable to techniques, methods, physical elements, and systems (whether currently known or otherwise), including extensions thereof inferred or inferable by those skilled in the art after reading this application.

Overview

The present disclosure is generally related to a force sensing device that may be incorporated into a variety of electronic or computing devices, such as, but not limited to, computers, smart phones, tablet computers, track pads, and so on. The force sensing device may be used to detect one or more user force inputs on an input surface and then a processor (or processing element) may correlate the sensed inputs into a force measurement and provide those inputs to the computing device. In some embodiments, the force sensing device may be used to determine force inputs to a track pad, a display screen, or other input surface.

The force sensing device may include an input surface, a force sensing module, a substrate or support layer, and optionally a sensing layer that may detect another input characteristic than the force sensing layer. The input surface provides an engagement surface for a user, such as the external surface of a track pad or the cover glass for a display. In other words, the input surface may receive one or more user inputs directly or indirectly.

The force sensing module may include an ultrasonic module or sensor that may emit and detect ultrasonic pulses. In one example, the ultrasonic module may include a plurality of sensing elements arranged in rows or columns, where each of the sensing elements may selectively emit an ultrasonic pulse or other signal. The pulse may be transmitted through the components of the force sensing device, such as through the sensing layer and the input surface. When the pulse reaches the input surface, it may be reflected by a portion of the user (e.g., finger) or other object, which may reflect the pulse. The reflection of the pulse may vary based on distance that the particular sensing element receiving the pulse is from the input. Additionally, the degree of attenuation of the pulse may also be associated with a force magnitude associated with the input. For example, generally, as the input force on the input surface increases, the contacting object exerting the force may absorb a larger percentage of the pulse, such that the reflected pulse may be diminished correspondingly.

In embodiments where it is present, the sensing layer may be configured to sense characteristics different from the force sensing module. For example, the sensing layer may include capacitive sensors or other sensing elements. In a specific implantation, a multi-touch sensing layer may be incorporated into the force sensing device and may be used to enhance data regarding user inputs. As an example, touch inputs detected by the sense layer may be used to further refine the force input location, confirm the force input location, and/or correlate the force input to an input location. In the last example, the force sensitive device may not use the capacitive sensing of the force sensing device to estimate a location, which may reduce the processing required for the force sensing device. Additionally, in some embodiments, a touch sensitive device may be used to determine force inputs for a number of different touches. For example, the touch positions and force inputs may be used to estimate the input force at each touch location.

Force Sensitive Device and System

Figure 1B:
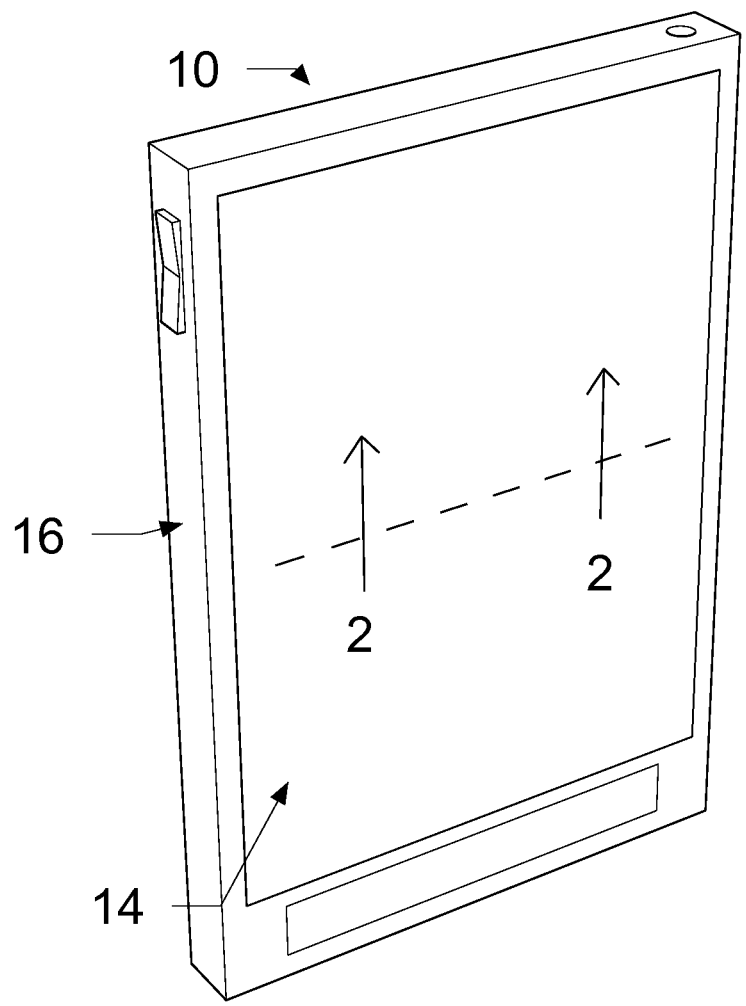
FIG. 1B is a front perspective view of a second example of a computing device incorporating a force sensing device.
Figure 1C:
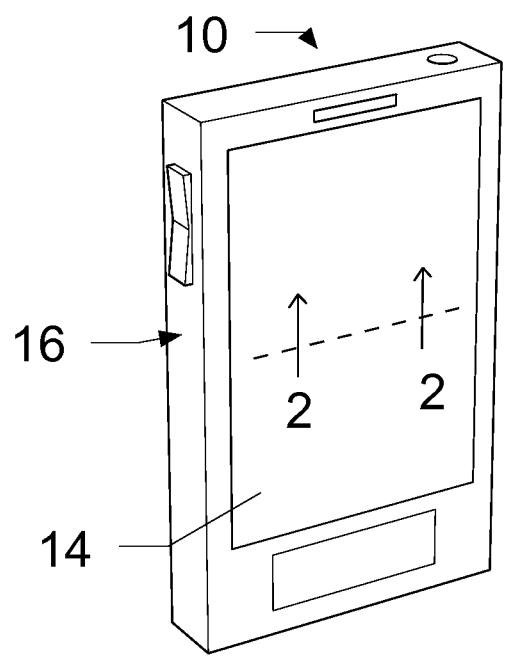
FIG. 1C is a front elevation view of a third example of a computing device incorporating the force sensing device.

Turning now to the figures, illustrative electronic devices that may incorporate the force sensing device will be discussed in more detail. FIGS. 1A-1C illustrate various computing or electronic devices that may incorporate the force sensing device. With reference to FIG. 1A, the force sensing device may be incorporated into a computer 10, such as a laptop or desktop computer. The computer 10 may include a track pad 12 or other input surface, a display 14, and an enclosure 16 or frame. The enclosure 16 may extend around a portion of the track pad 12 and/or display 14. In the embodiment illustrated in FIG. 1A, the force sensing device may be incorporated into the track pad 12, the display 14, or both the track pad 12 and the display 14. In these embodiments, the force sensing device may be configured to detect force inputs to the track pad 12 and/or the display 14.

In some embodiments, the force sensing device may be incorporated into a tablet computer. FIG. 1B is a top perspective view of a tablet computer including the force sensing device. With reference to FIG. 1B, the table computer 10 may include the display 14 where the force sensing device is configured to detect force inputs to the display 14. In addition to the force sensing device, the display 14 may also include one or more touch sensors, such as a multi-touch capacitive grid, or the like. In these embodiments, the display 14 may detect both force inputs, as well as position or touch inputs.

In yet other embodiments, the force sensing device may be incorporated into a mobile computing device, such as a smart phone. FIG. 1C is a perspective view of a smart phone including the force sensing device. With reference to FIG. 1C, the smart phone 10 may include a display 14 and a frame or enclosure 16 substantially surrounding a perimeter of the display 14. In the embodiment illustrated in FIG. 1C, the force sensing device may be incorporated into the display 14. Similarly to the embodiment illustrated in FIG. 1B, in instances where the force sensing device may be incorporated into the display 14, the display 14 may also include one or more position or touch sensing devices in addition to the force sensing device.

Figure 2:
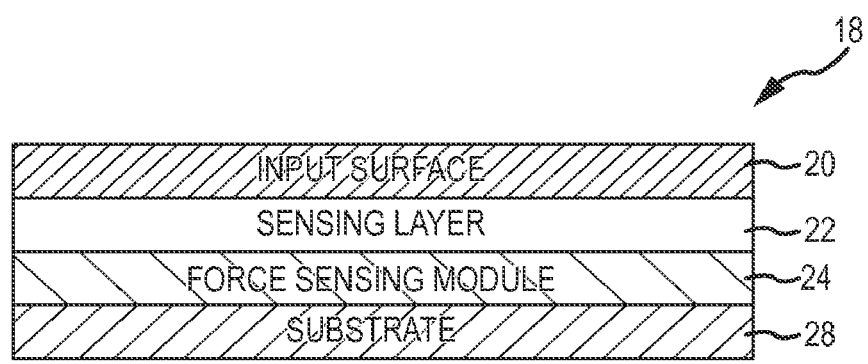
FIG. 2 is a simplified cross-section view of the computing device taken along line 2¬2 in FIG. 1A.

The force sensing device will now be discussed in more detail. FIG. 2 is a simplified cross-section view of the electronic device taken along line 2-2 in FIG. 1A. With reference to FIG. 2, the force sensing device 18 may include an input surface 20, a sensing layer 22, a force sensing module 24 or layer, and a substrate 28. As discussed above with respect to FIGS. 1A-1C, the input surface 20 may form an exterior surface (or a surface in communication with an exterior surface) of the track pad 12, the display 14, or other portions (such as the enclosure) of the computing device 10. In some embodiments, the input surface 20 may be at least partially translucent. For example, in embodiments where the force sensing device 18 is incorporated into a portion of the display 14.

The sensing layer 22 may be configured to sense one or more parameters correlated to a user input. In some embodiments, the sensing layer 22 may be configured to sense characteristics or parameters that may be different from the characteristics sensed by the force sensing module 24. For example, the sensing layer 22 may include one or more capacitive sensors that may be configured to detect input touches, e.g., multi-touch input surface including intersecting rows and columns. The sensing layer 22 may be omitted where additional data regarding the user inputs may not be desired. Additionally, the sensing layer 22 may provide additional data that may be used to enhance data sensed by the force sensing module 24 or may be different from the force sensing module. In some embodiments, there may be an air gap between the sensing layer 22 and the force sensing module 24. In other words, the force sensing module 24 and sensing layer may be spatially separated from each other defining a gap or spacing distance.

The substrate 28 may be substantially any support surface, such as a portion of an printed circuit board, the enclosure 16 or frame, or the like. Additionally, the substrate 28 may be configured to surround or at least partially surround one more sides of the sensing device 18.

In some embodiments, a display (e.g., a liquid crystal display) may be positioned beneath the input surface 20 or may form a portion of the input surface 20. Alternatively, the display may be positioned between other layers of the force sensing device. In these embodiments, visual output provided by the display may be visible through the input surface 20.

As generally discussed above, the force sensing device may be incorporated into one or more touch sensitive device.

Figure 3:
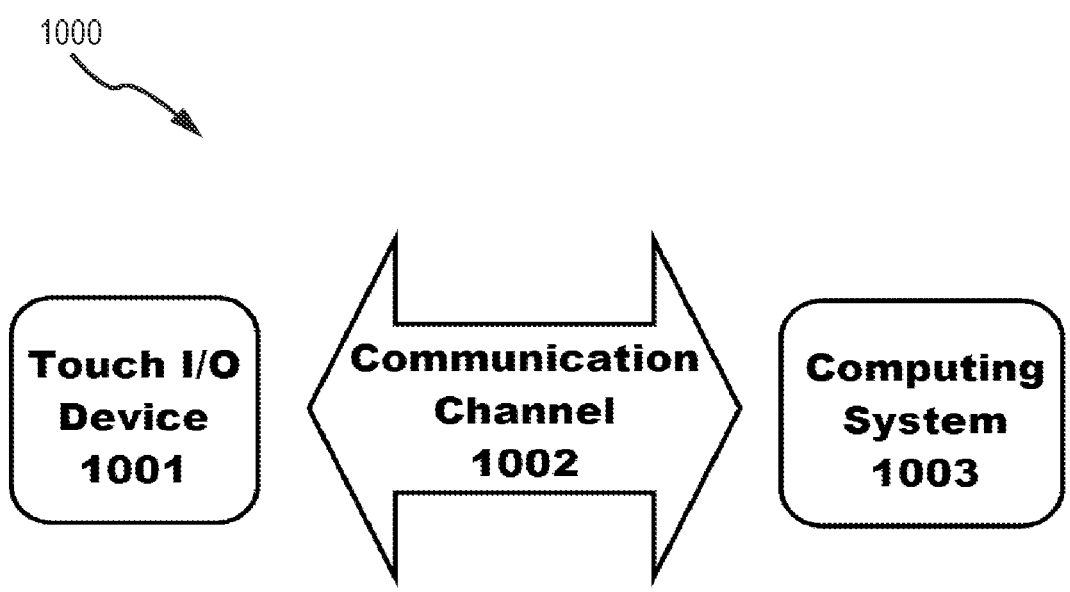
FIG. 3 shows a conceptual drawing of communication between a touch I/O device and a computing system.
Figure 4:
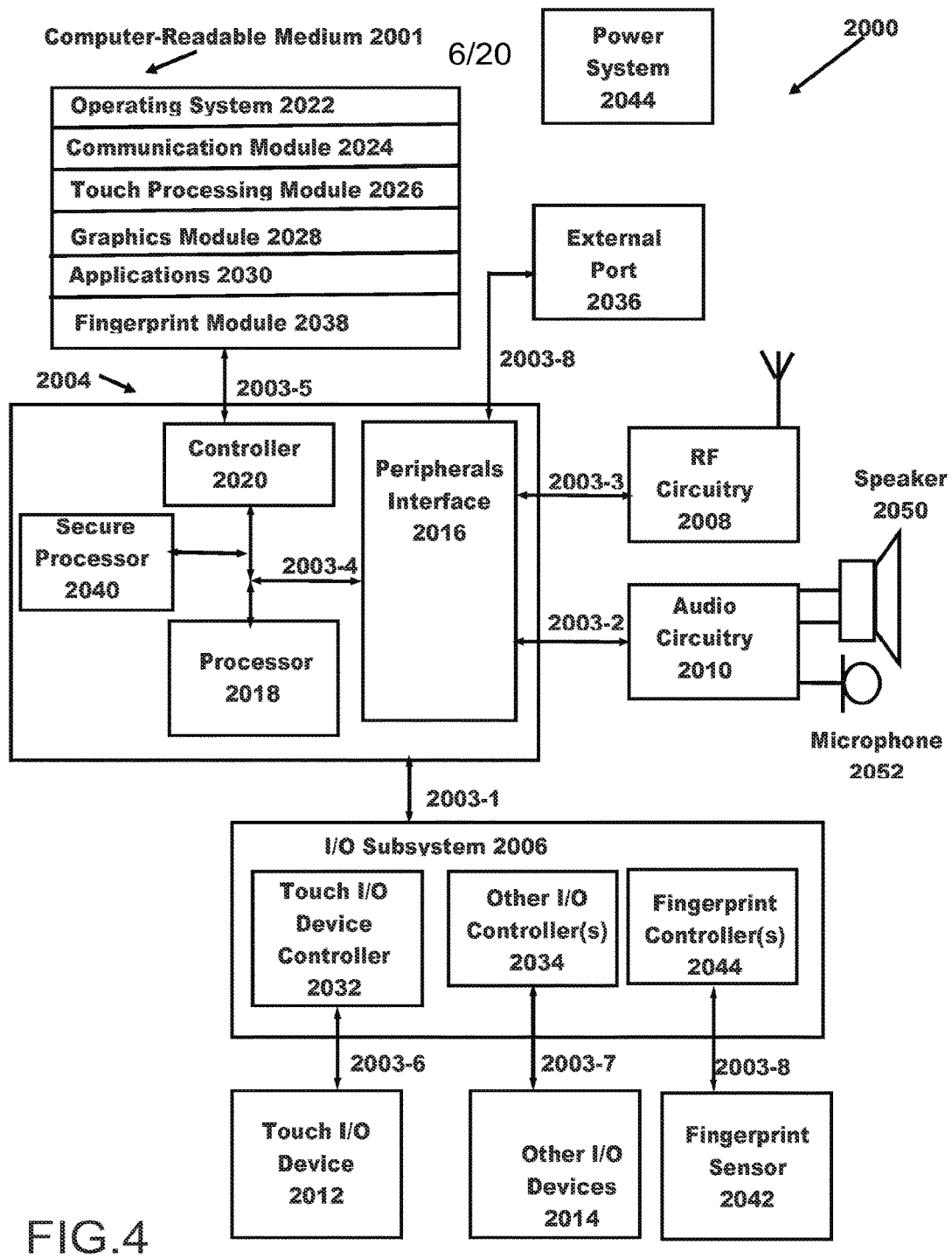
FIG. 4 shows a conceptual drawing of a system including a touch sensing and force sensing I/O device.

FIG. 3 shows a conceptual drawing of communication between a touch I/O device and a computing system. FIG. 4 shows a conceptual drawing of a system including a force sensitive touch device.

Described embodiments may include touch I/O device 1001 that can receive touch input and force input (such as possibly including touch locations and force of touch at those locations) for interacting with computing system 1003 (such as shown in FIGS. 1A-3) via wired or wireless communication channel 1002. Touch I/O device 1001 may be used to provide user input to computing system 1003 in lieu of or in combination with other input devices such as a keyboard, mouse, or possibly other devices. In alternative embodiments, touch I/O device 1001 may be used in conjunction with other input devices, such as in addition to or in lieu of a mouse, trackpad, or possibly another pointing device. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive and force sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, disposed on a trackpad or other pointing device), any multi-dimensional object having a touch sensitive surface for receiving touch input, or another type of input device or input/output device.

In one example, touch I/O device 1001 embodied as a touch screen may include a transparent and/or semitransparent touch sensitive and force sensitive panel at least partially or wholly positioned over at least a portion of a display. (Although the touch sensitive and force sensitive panel is described as at least partially or wholly positioned over at least a portion of a display, in alternative embodiments, at least a portion of circuitry or other elements used in embodiments of the touch sensitive and force sensitive panel may be at least positioned partially or wholly positioned under at least a portion of a display, interleaved with circuits used with at least a portion of a display, or otherwise.) According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive and force sensitive components/devices are integral with display components/devices. In still other embodiments a touch screen may be used as a supplemental or additional display screen for displaying supplemental or the same graphical data as a primary display and to receive touch input, including possibly touch locations and force of touch at those locations.

Touch I/O device 1001 may be configured to detect the location of one or more touches or near touches on device 1001, and where applicable, force of those touches, based on capacitive, resistive, optical, acoustic, inductive, mechanical, chemical, or electromagnetic measurements, in lieu of or in combination or conjunction with any phenomena that can be measured with respect to the occurrences of the one or more touches or near touches, and where applicable, force of those touches, in proximity to device 1001. Software, hardware, firmware or any combination thereof may be used to process the measurements of the detected touches, and where applicable, force of those touches, to identify and track one or more gestures. A gesture may correspond to stationary or non-stationary, single or multiple, touches or near touches, and where applicable, force of those touches, on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, consecutively, or otherwise. A gesture may be characterized by, but is not limited to a pinching, sliding, swiping, rotating, flexing, dragging, tapping, pushing and/or releasing, or other motion between or with any other finger or fingers, or any other portion of the body or other object. A single gesture may be performed with one or more hands, or any other portion of the body or other object by one or more users, or any combination thereof.

Computing system 1003 may drive a display with graphical data to display a graphical user interface (GUI). The GUI may be configured to receive touch input, and where applicable, force of that touch input, via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs or dials, virtual buttons, virtual levers, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input, and where applicable, force of that touch input, on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches, and where applicable, force of those touches, on touch I/O device 1001. Feedback may be transmitted optically, mechanically, electrically, olfactory, acoustically, haptically, or the like or any combination thereof and in a variable or non-variable manner.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other (portable or non-portable) system or device adaptable to the inclusion of system architecture 2000, including combinations of two or more of these types of devices. FIG. 4 is a block diagram of one embodiment of system 2000 that generally includes one or more computer-readable mediums 2001, processing system 2004, Input/Output (I/O) subsystem 2006, electromagnetic frequency (EMF) circuitry (such as possibly radio frequency or other frequency circuitry) 2008 and audio circuitry 2010. These components may be coupled by one or more communication buses or signal lines 2003. Each such bus or signal line may be denoted in the form 2003-X, where X can be a unique number. The bus or signal line may carry data of the appropriate type between components; each bus or signal line may differ from other buses/lines, but may perform generally similar operations.

It should be apparent that the architecture shown in FIGS. 1A-4 are only one example architecture of system 2000, and that system 2000 could have more or fewer components than shown, or a different configuration of components. The various components shown in FIGS. 3-4 can be implemented in hardware, software, firmware or any combination thereof, including one or more signal processing and/or application specific integrated circuits.

EMF circuitry 2008 is used to send and receive information over a wireless link or network to one or more other devices and includes well-known circuitry for performing this function. EMF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch and force-of-touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise Re-arranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via EMF circuitry 2008 and includes various software components for handling data received from EMF circuitry 2008 and/or external port 2036.

Graphics module 2028 includes various known software components for rendering, animating and displaying graphical objects on a display surface. In embodiments in which touch I/O device is a touch sensitive and force sensitive display (e.g., touch screen), graphics module 2028 includes components for rendering, displaying, and animating objects on the touch sensitive and force sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system, also sometimes referred to herein as "GPS"), a music player, and otherwise.

In one embodiment, the system may implement a "home screen" that is displayed so that a user may select from a number of applications installed on the system. A home screen embodiment may include an array of selectable icons arranged in rows and columns and displayed on a display screen. Each icon may represent a particular application and when the user selects the icon by touch or otherwise, the system launches the application. The icons may represent applications that have been added to the system by the user or applications that are built into the system. One example of an application that is built into the system is a music player.

As used herein, when the system displays the home screen or runs an application, the system is said to be in a specific "mode of operation." Examples of other modes of operation include a recently-used application selector interface, a search function interface, a lock screen and a voice command interface. As described in greater detail below, the system may implement a "home button" that allows the user to shift the system between various modes of operation.

A "recently-used application selector interface" may be a menu that contains an icon for each application that was recently launched by the user. In one embodiment, the system displays the recently-used application selector interface in the bottom portion of the display screen. In this or other embodiments, the recently-used application selector interface displays icons for the four most recently launched applications.

A "search function interface" may be displayed to allow a user to search for content that is stored on the system. In one embodiment, the search function interface includes a dialog box and an input mechanism such as virtual keypad or keyboard by which the user may enter a search string. Once the user has entered a search string, the search function interface may search the device to find related content.

A "lock screen" may be displayed to indicate that system is locked and therefore not accessible without password entry. In one embodiment, the lock screen displays a numeric key pad that allows a user to enter the appropriate password. In this or other embodiments, the system may disable itself after a predetermined number of failed password entry attempts.

A "voice command interface" may be displayed to allow a user to enter certain commands by speaking into the device. In one embodiment, the voice command interface includes a virtual microphone or other appropriate icon that is displayed on a portion of the display surface. When the user speaks a command into the device, the voice command interface may execute the command, as appropriate.

Touch and force-of-touch processing module 2026 includes various software components for performing various tasks associated with touch I/O device including but not limited to receiving and processing touch input and force-of-touch input received from I/O device 2012 via touch I/O device controller 2032.

System 2000 may further include fingerprint sensing module 2038 for performing the method/functions as described herein in connection with other figures shown and described herein.

I/O subsystem 2006 is coupled to touch I/O device and one or more other I/O devices 2014 for controlling or performing various functions. Touch I/O device communicates with processing system 2004 via touch I/O device controller 2032, which includes various components for processing user touch input and force-of-touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device displays visual output to the user in a GUI. The visual output may include text, graphics, video, and any combination thereof. Some or all of the visual output may correspond to user-interface objects. Touch I/O device forms a touch-sensitive and force-sensitive surface that accepts touch input and force-of-touch input from the user. Touch I/O device and touch screen controller 2032 (along with any associated modules and/or sets of instructions in medium 2001) detects and tracks touches or near touches, and where applicable, force of those touches (and any movement or release of the touch, and any change in the force of the touch) on touch I/O device and converts the detected touch input and force-of-touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad or trackpad), the user may indirectly interact with graphical objects that are displayed on a separate display screen embodied as I/O device 2014.

Touch I/O device may be analogous to the multi-touch sensitive surface described in the following U.S. Pat. Nos. 6,323,846, 6,570,557, and/or 6,677,932, and/or U.S. Patent Publication 2002/0015024A1, each of which is hereby incorporated by reference.

Embodiments in which touch I/O device is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device based on the user's touch, and force-of-touch, input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

Figure 5:
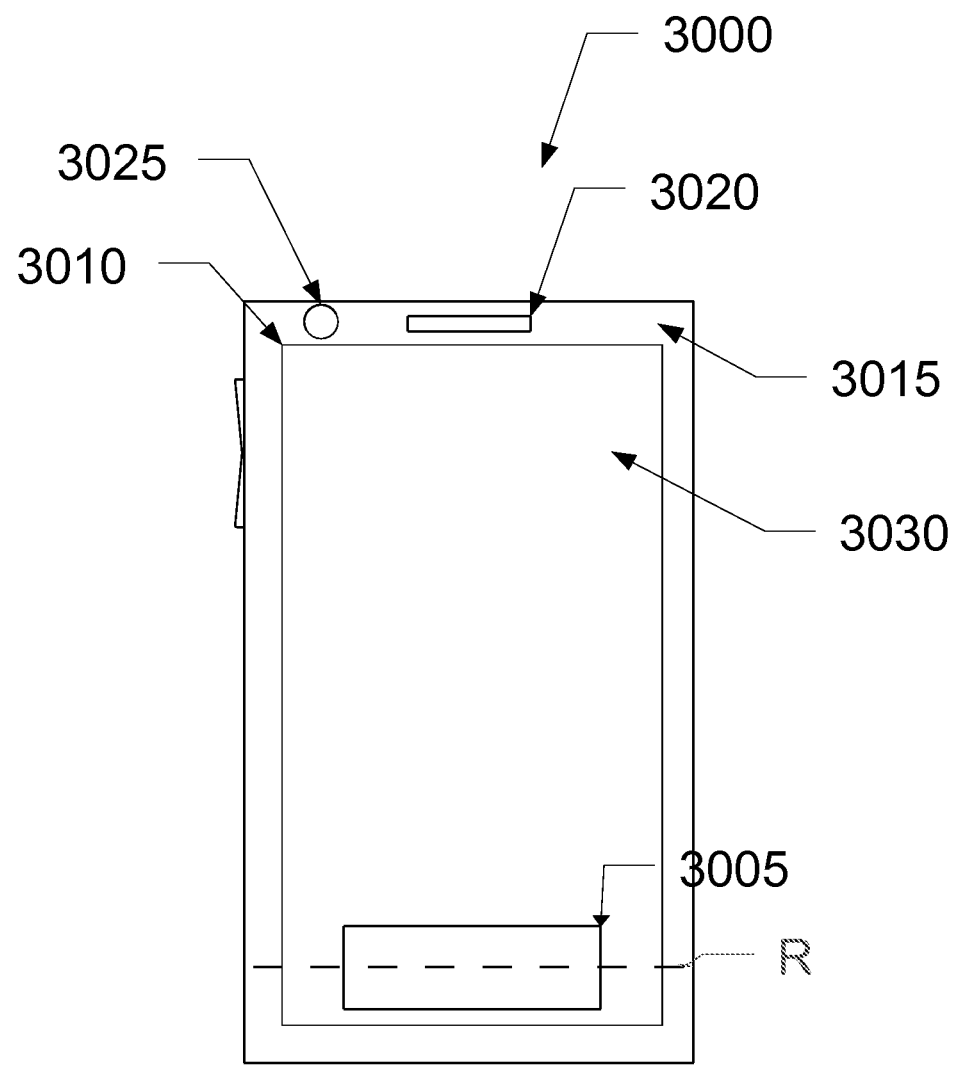
FIG. 5 is an illustration of electronic device embodiment having a home button within a display screen boundary.

FIG. 5 is an illustration of an electronic device embodiment 3000 in accordance with embodiments discussed herein. The electronic device 3000 is adapted to allow a user to enter a number of different commands into the electronic device 3000 through a single button, called the home button. The electronic device 3000 is configured to distinguish between or among the different commands entered through the home button by the amount of force by which the user presses the home button. In one embodiment, a light touch may indicate a first command and a heavier touch may indicate a second command. In another embodiment, a light touch may indicate a first command, a medium touch may indicate a second command, and a heavier touch may indicate a third command.

By way of example, when the electronic device 3000 is running an application, the electronic device 3000 may be configured to receive a first home-button command that causes the device to exit the application. Further, the electronic device 3000 may also be configured to receive a second home-button command that causes the device to enter a recently-used application selector interface. The electronic device 3000 may distinguish between the first and second command by measuring the amount of force the user applies when she presses the home button. Here, a light touch may indicate the application exit command and a medium touch may indicate the command to enter the application selector interface. In another example, the electronic device may distinguish between these two commands, as well as a third command indicated by a heavy touch.

The set of different commands that may be entered through the home button may vary depending on the mode in which the electronic device 3000 is running. For example, as described above, when the electronic device 3000 is running an application, the electronic device 3000 may be configured to receive a first home button command that causes the device to exit the application and a second home button command that causes the device to enter a recently-used application selector interface. When the electronic device 3000 is not running an application, the electronic device 3000 may be configured to receive a different set of commands through the operation of the home button. For example, if the device is currently at the home screen, the electronic device 3000 may be configured to receive a home-button command to enable a search function interface. If the device is at the lock screen, the electronic device 3000 may be configured to receive a home-button command to enable a music player and to display a panel of music player controls.

In some embodiments, the electronic device may be configured to receive the same home button command in more than one mode of operation. More specifically, a particular level of force may correspond to the same home button command across various modes of operation for the electronic device. For example, a home button command that enables the voice command interface may be available both when the electronic device is running an application and when the electronic device is at the home screen. In one embodiment, pressing the home button with a heavy touch while the device is running an application may cause the electronic device to execute the voice command interface. Similarly, pressing the home button with a heavy touch while the device is at the home screen may cause the electronic device to execute the voice command interface. Pressing the home button with a heavy touch may also cause the electronic device to execute the voice command interface in other modes of operation. For example, pressing the home button with a heavy touch while the device is at the lock screen may also cause the electronic device to execute the voice command interface.

Throughout this disclosure, the operation of the home button is described as executing certain "home-button commands." Typically, a "home-button command" is a higher level command than an application level command that may be entered through other input mechanisms, such as touch input on a portion of a touch screen that does not include the home-button. For example, a home-button command may be one that switches the mode of operation of the device. As describe above, home button command embodiments include those that cause the electronic device to exit a currently running application and enter the home screen. In contrast, an application level command may be one that is input through other input mechanisms and may be directed a particular application that is currently running on the electronic device. More specifically, application level commands may correlated with icons or other graphics that are displayed for a temporary period of time. In contrast to these icons or other graphics, the home button typically persists over time and is available for use anytime the device is in operation. In most embodiments, the home button is always found in the same location on the electronic device. Although a "home-button command" is typically described herein as a higher level command there is no particular requirement for this. Accordingly, a device consistent with this disclosure could implement an application level command that this entered through the home button.

FIG. 5 is an illustration of an electronic device embodiment 3000 that contains a home button 3005 that is within the boundaries of a touch sensitive display panel 3010. In some embodiments, the touch sensitive display panel 3010 is located within a black mask 3015 or other border area 3015 that contains other elements such as a speaker 3020 and a camera 3025 The electronic device 3000 embodiment shown in FIG. 3 implements the home button 3005 as an image that is displayed by an image-producing element that underlies the touch sensitive display panel 3010. In addition to the image-producing element, a force sensing element also underlies the touch sensitive display panel 3010 directly beneath the home button image in order to measure the force with which a user presses the home button 3005 image. The structure that underlies the home button 3005 shown in FIG. 5 is described in greater detail in connection with FIG. 7A and FIG. 7B.

Figure 6:
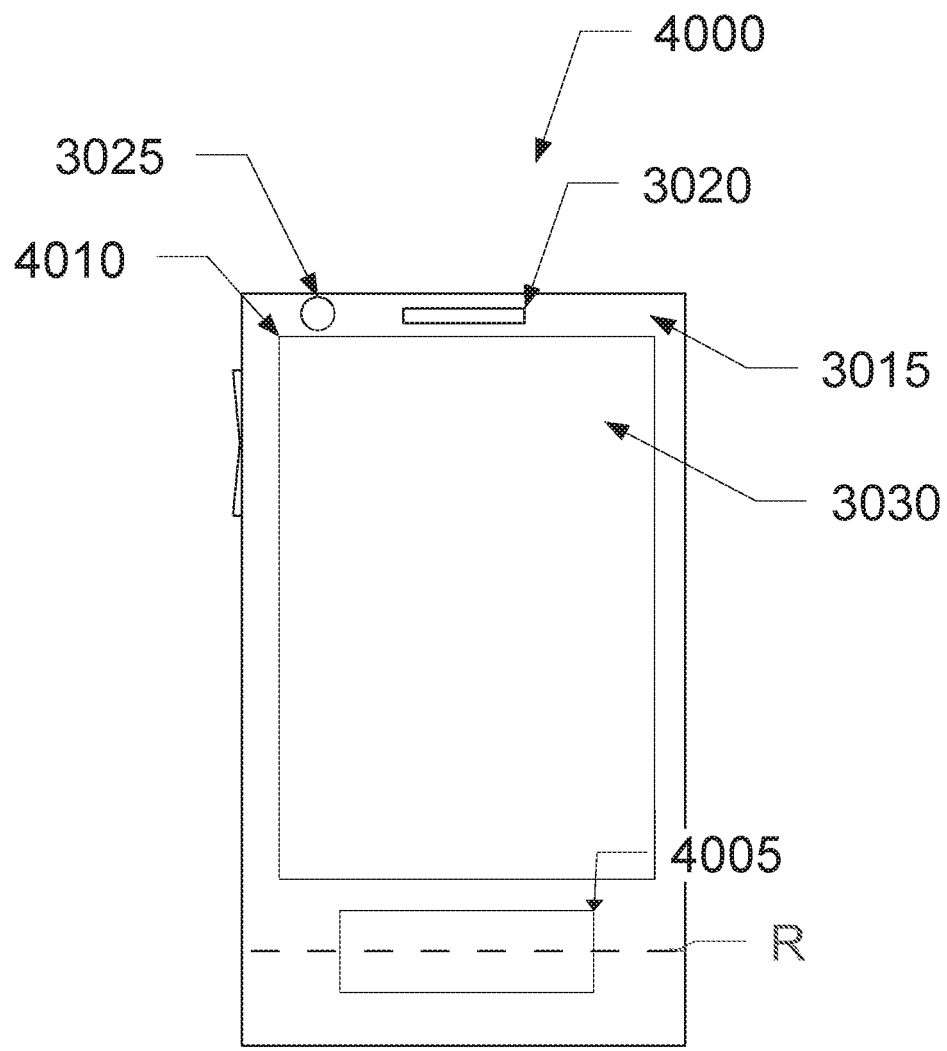
FIG. 6 is an illustration of electronic device embodiment having a home button outside of a display screen boundary.

FIG. 6 is an illustration of an electronic device embodiment 4000 that contains a home button 4005 that is outside the boundaries of a touch sensitive display panel 4010, within the black mask area 3015. More specifically, the home button 4005 may be located within a border area 3015 that contains other elements such as a speaker 3020 and a camera 3025 The electronic device 4000 may include an icon or other image on the glass that indicates the location of the home button. In various embodiments, the icon may be a printed or stamped image; or the icon may be cut or etched into the glass.

The home button 4005 may function the same as the home button 3005 that is shown in FIG. 5. Nevertheless, the electronic device 4000 may implement the home button 4005 without the use an image-producing element that underlies the touch sensitive display panel 3010. Like the electronic device embodiment shown in FIG. 5, a force sensing element underlies the touch sensitive display panel 3010 directly beneath the home button in order to measure the force with which a user presses the home button 3005. The structure that underlies the home button 4005 shown in FIG. 4 is described in greater detail in connection with FIG. 7C.

Figure 7A:
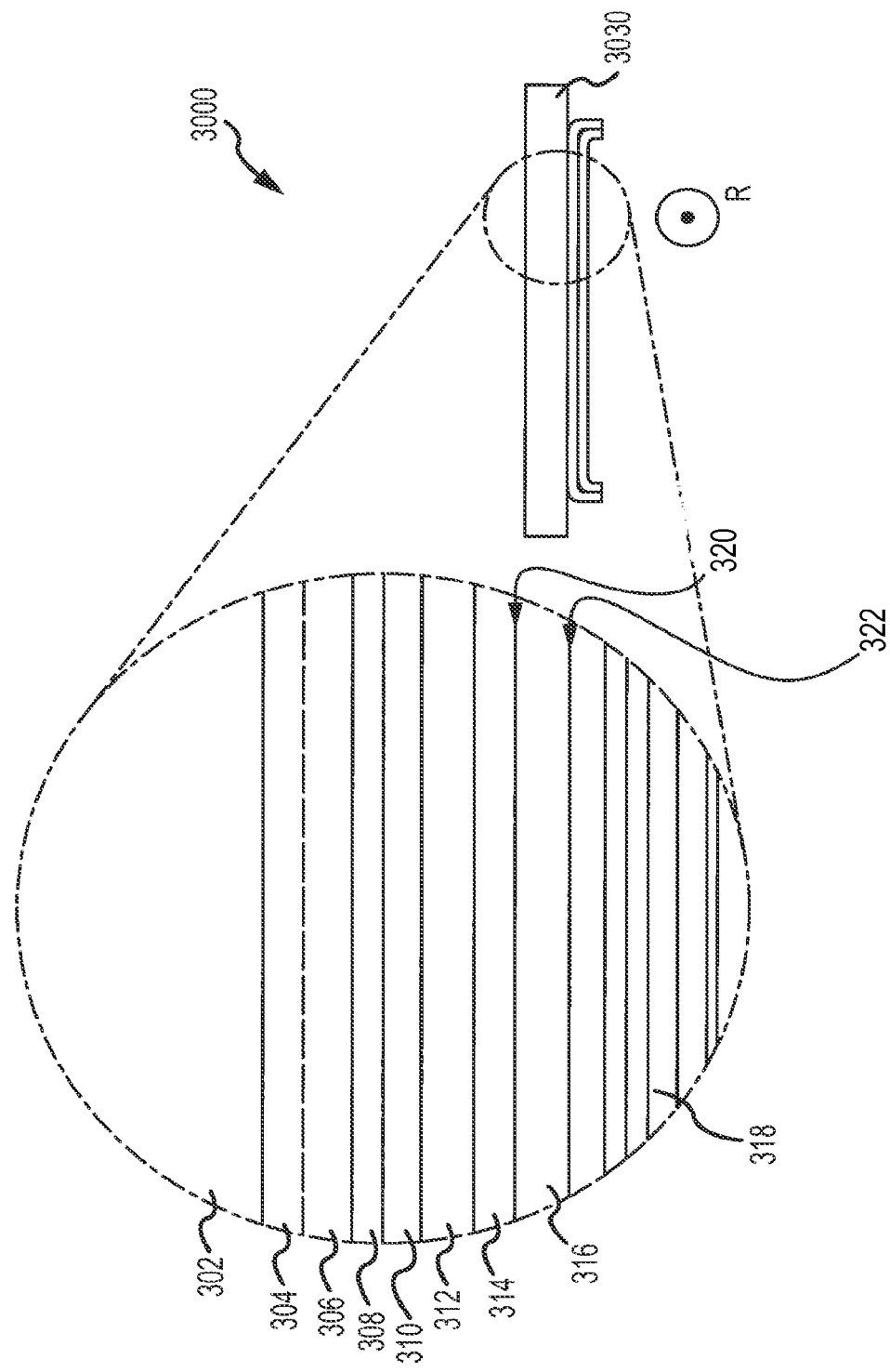
FIG. 7A shows a conceptual drawing of a system including ultrasound-based sensing with integrated touch modules, including a liquid crystal display (LCD) construction option.

FIG. 7A shows a conceptual drawing of a system including ultrasound-based sensing, including a liquid crystal display (LCD) construction option. FIG. 7A shows a system 3030 including ultrasound-based sensing with includes a touch I/O device 3000 as described herein, including a cover glass (CG) element, which may be touched by the user, and for which force-of-touch may be sensed. An ultrasound-based force sensing element is disposed below the cover glass.

In one embodiment, the touch I/O device can include a liquid crystal display (LCD) construction option with a cover glass (CG) element 302 that, in some implementations, may have a thickness of approximately 600 microns. The cover glass (CG) element 302 might be used to receive touch and force of touch from the user. The cover glass (CG) element 302 can be constructed using one or more layers of glass, chemically treated glass, sapphire, or one or more other substances.

In one embodiment, the liquid crystal display (LCD) construction option can include a first optically clear adhesive (OCA) element 304 disposed below the cover glass element, which in some implementations, can have a thickness of approximately 150 microns.

In one embodiment, the liquid crystal display (LCD) construction option can include a top point of load (POL) element 306 disposed below the first optically clear adhesive (OCA) element 304, which, in some implementations, can have a thickness of approximately 200 microns. The top POL element 306 might be used to distribute power to elements of the touch I/O device.

In one embodiment, the liquid crystal display (LCD) construction option can include a CF glass element 308 disposed below the top POL element 306, which, in some implementations, can have a thickness of approximately 150 microns.

In one embodiment, the liquid crystal display (LCD) construction option can include a thin film transistor (TFT) LCD glass element 310 disposed below the top POL element 306, which, in some implementations, can have a thickness of approximately 150 microns. The TFT LCD element 310 might be used to present display elements for the touch I/O device. As described above in connection with FIG. 5, the TFT LCD element may be used to display a home-button image.

In one embodiment, the liquid crystal display (LCD) construction option can include a bottom POL element 312 disposed below the TFT LCD glass element 310, which, in some implementations, can have a thickness of approximately 200 microns. Similar to the top POL element 306, the bottom POL element 312 might be used to distribute power to elements of the touch device 2012.

In one embodiment, the liquid crystal display (LCD) construction option can include a second first optically clear adhesive (OCA) element 314 disposed below the bottom POL element 312, which, in some implementations, can have a thickness of approximately 150 microns.

In one embodiment, the liquid crystal display (LCD) construction option can include an ultrasonic sensing element 316, which may be polyvinylidene difluoride (PVDF), disposed below the second first optically clear adhesive (OCA) element 312, which, in some implementations, can have a thickness of approximately 50 microns.

In one embodiment, the liquid crystal display (LCD) construction option can include a set of backlight layers 318 disposed below the ultrasonic sensing element 316. The backlight layers 318, in combination with the TFT LCD glass element, can provide the touch I/O device with a display capability.

In one embodiment, the liquid crystal display (LCD) construction option can include a set of semi-transparent sense column circuits 320, disposed below the second optically clear adhesive (OCA) element 314. For example, the semi-transparent sense column circuits 320 can include one or more metal layers or metallized layers, in which circuit elements are disposed. In one such example, the circuit elements are disposed in a set of horizontal and vertical wire elements, located so as not to cover the TFT LCD elements (or other related display elements), with the effect that the circuits do not cause the lighted elements of the display to be substantially hindered or obscured. Similarly, in one embodiment, the liquid crystal display (LCD) construction option can include a second of semi-transparent row driver circuits 322, disposed below the ultrasonic sensing element 316. For example, the semi-transparent row driver circuits 322 can also include one or more metal layers or metallized layers, in which circuit elements are disposed. In one such example, the circuit elements are disposed in a set of horizontal and vertical wire elements, located so as not to cover the TFT LCD elements (or other related display elements), with the effect that the circuits do not cause the lighted elements of the display to be substantially hindered or obscured. The sense column circuits and the row driver circuits are further described below.

Figure 7B:
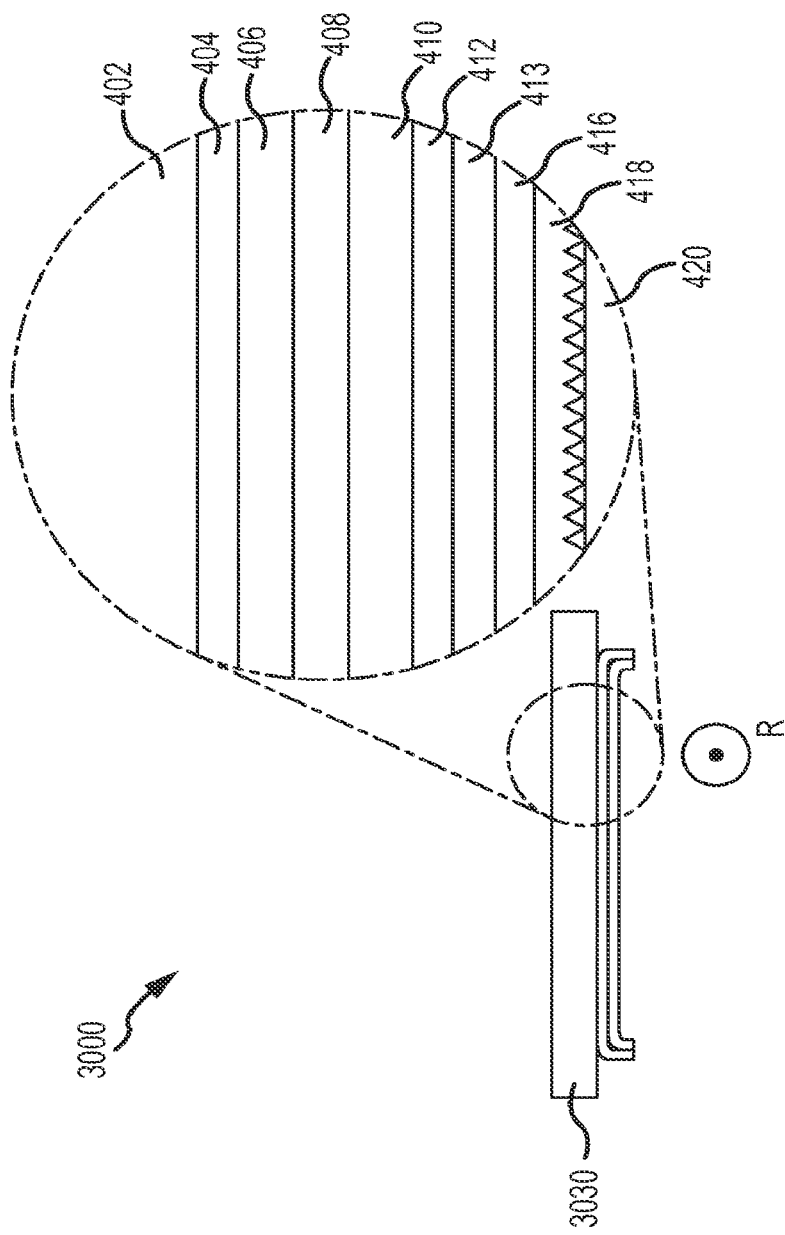
FIG. 7B shows a conceptual drawing of a system including ultrasound-based sensing with integrated touch modules, including a plastic organic light-emitting diode (OLED) construction option.

FIG. 7B shows a conceptual drawing of a system including ultrasound-based sensing, including a plastic organic light-emitting diode (OLED) construction option. FIG. 7B shows a system including ultrasound-based sensing, including a cover glass (CG) element 402, which may be touched by the user, and for which force-of-touch may be sensed. An ultrasound-based force sensing element is disposed below the cover glass.

In one embodiment, the touch I/O device 4000 can include a plastic organic light-emitting diode (OLED) construction option. The plastic organic light-emitting diode (OLED) construction option can include the cover glass (CG) element 402, which, in some implementations, can have a thickness of approximately 600 microns. The cover glass (CG) element 402 might be used to receive touch and force of touch from the user. The cover glass (CG) element 402 can be constructed using one or more layers of glass, chemically treated glass, sapphire, or one or more other substances.

In one embodiment, the plastic organic light-emitting diode (OLED) construction option can include a first optically clear adhesive (OCA) element 404 disposed below the cover glass element, which, in some implementations, can have a thickness of approximately 150 microns.

In one embodiment, the plastic organic light-emitting diode (OLED) construction option can include a plastic film dual indium-titanium oxide (DITO) element 406 disposed below the first optically clear adhesive (OCA) element 404, which, in some implementations, may have thickness of approximately 115 microns.

In one embodiment, the plastic organic light-emitting diode (OLED) construction option can include a second optically clear adhesive (OCA) element 408 disposed below the DITO element 406, which, in some implementations, can have a thickness of approximately 150 microns.

In one embodiment, the plastic organic light-emitting diode (OLED) construction option can include a plastic OLED display element 410 disposed below the second optically clear adhesive (OCA) element 408, which, in some implementations, can have a thickness of approximately 250 microns. As described above in connection with FIG. 6, the plastic OLED element may be used to display a home-button image.

In one embodiment, the plastic organic light-emitting diode (OLED) construction option can include an ultrasonic sensing element 414 disposed below the plastic OLED display element 410, which, in some implementations, can have a thickness of approximately 50 microns.

In one embodiment, the plastic organic light-emitting diode (OLED) construction option can include a foam or rubber element 418 disposed below the ultrasonic sensing element 414, and a mid-plate element 420 (such as a support element) disposed below the foam or rubber element 418.

In one embodiment, the plastic organic light-emitting diode (OLED) construction option can include a set of semi-transparent sense column circuits 412, disposed below the second optically clear adhesive (OCA) element 408. For example, the semi-transparent sense column circuits 412 can include one or more metal layers or metallized layers, in which circuit elements are disposed. In one such example, the circuit elements are disposed in a set of horizontal and vertical wire elements, located so as not to cover the plastic OLED elements (or other related display elements), with the effect that the circuits do not cause the lighted elements of the display to be substantially hindered or obscured. Similarly, in one embodiment, the plastic organic light-emitting diode (OLED) construction option can include a second of semi-transparent row driver circuits 416, disposed below the ultrasonic sensing element 414. For example, the semi-transparent row driver circuits 416 can include one or more metal layers or metallized layers, in which circuit elements are disposed. In one such example, the circuit elements are disposed in a set of horizontal and vertical wire elements, located so as not to cover the plastic OLED elements (or other related display elements), with the effect that the circuits do not cause the lighted elements of the display to be substantially hindered or obscured. The sense column circuits and the row driver circuits are further described below.

Figure 7C:
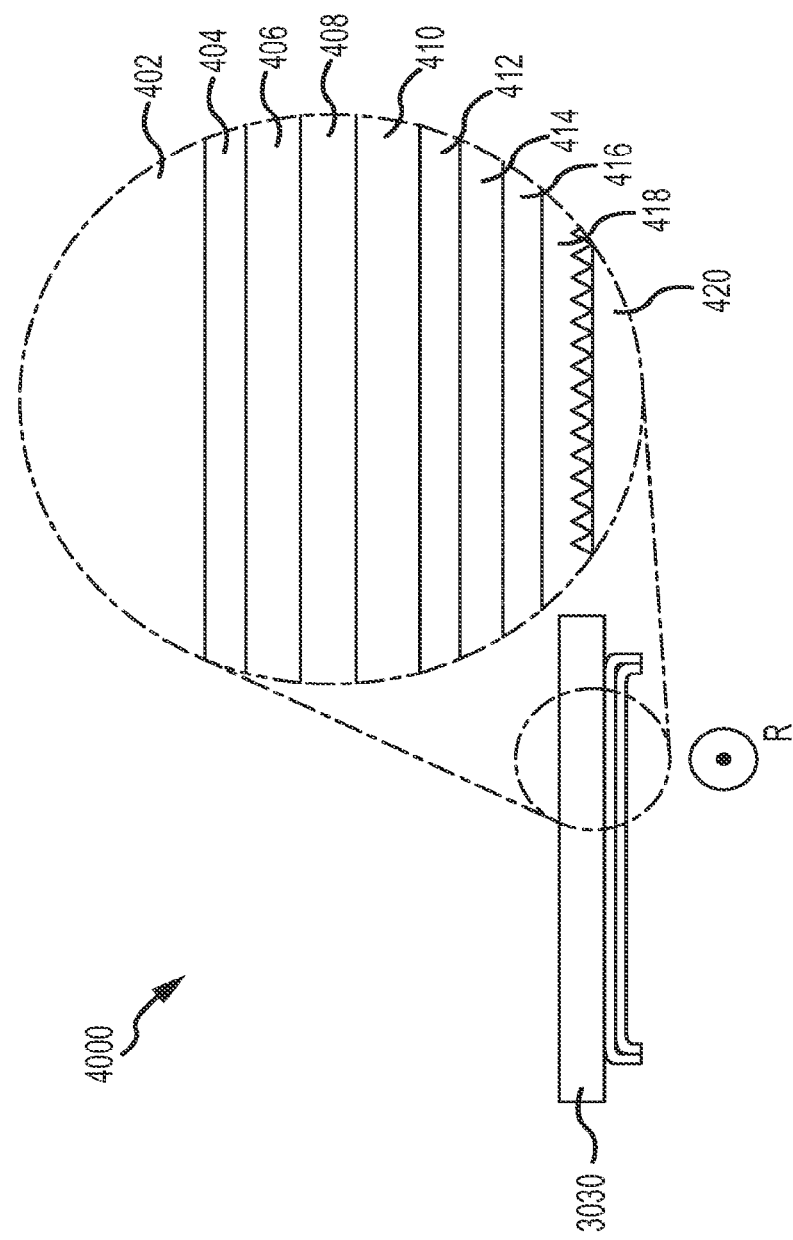
FIG. 7C shows a conceptual drawing of a system including ultrasound-based sensing with integrated touch modules, including an alternative construction option.

FIG. 7C is an illustration of construction option embodiment that underlies the home button 4005 without the use an image-producing element that underlies the touch sensitive display panel 3010. The electronic device 400 does, however, include a force sensing element underlying the touch sensitive display panel 3010 directly beneath the home button in order to measure the force with which a user presses the home button 3005. In this regard, the construction option embodiment shown in FIG. 7C can include a set of semi-transparent sense column circuits, disposed below the second optically clear adhesive (OCA) element. For example, the semi-transparent sense column circuits can include one or more metal layers or metallized layers, in which circuit elements are disposed. In one such example, the circuit elements are disposed in a set of horizontal and vertical wire elements. Similarly, in one embodiment, the construction option embodiment shown in FIG. 7C can include a second of semi-transparent row driver circuits, disposed below the ultrasonic sensing element. For example, the semi-transparent row driver circuits can include one or more metal layers or metallized layers, in which circuit elements are disposed. In one such example, the circuit elements are disposed in a set of horizontal and vertical wire elements. The sense column circuits and the row driver circuits are further described below.

Figure 8A:
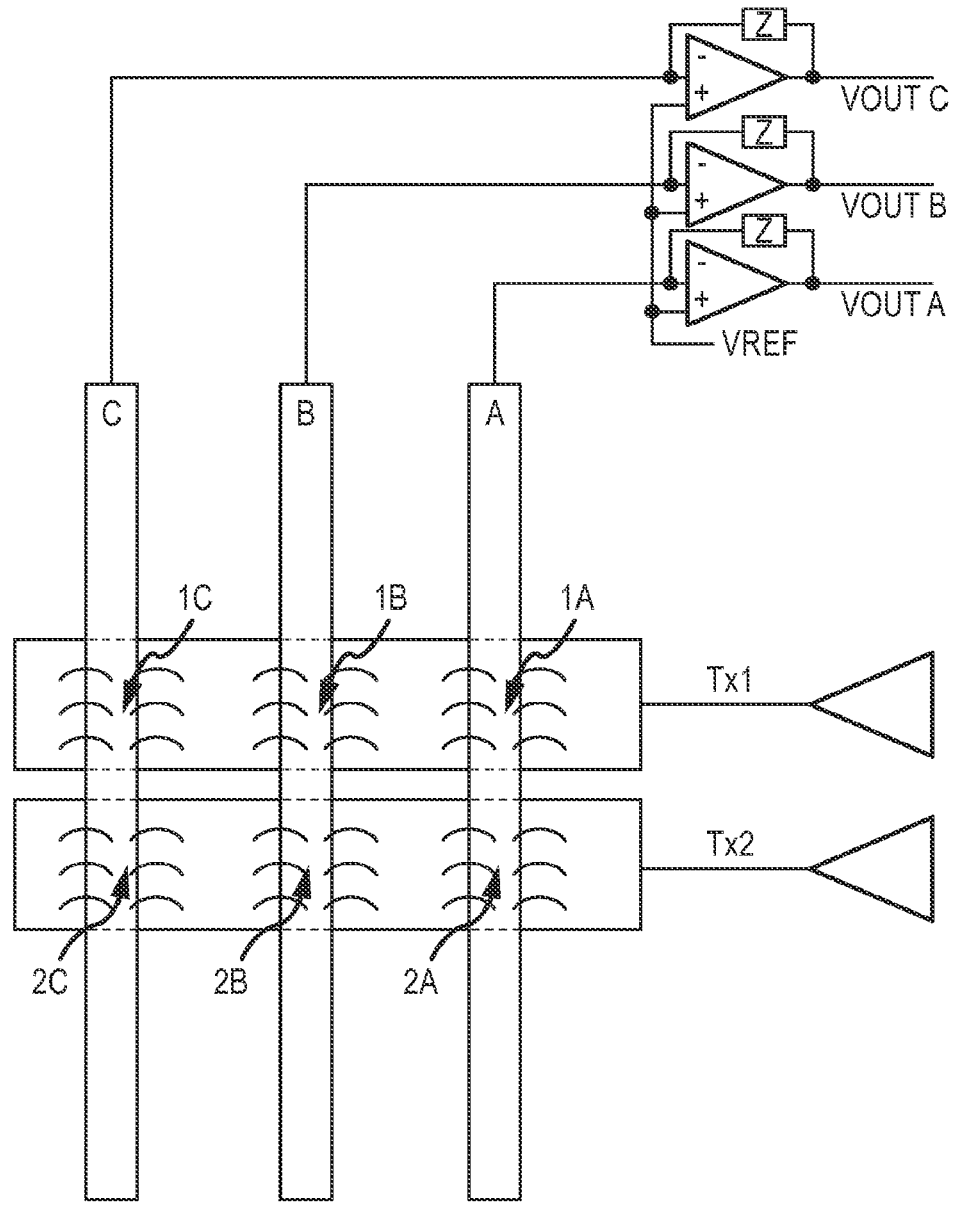
FIG. 8A shows a conceptual drawing of a system including ultrasound-based sensing with integrated touch modules, including row drivers and sense columns.

FIG. 8A shows a conceptual drawing of a system including ultrasound-based sensing with integrated touch modules, including row drivers and sense columns.

FIG. 8B shows a conceptual drawing of a system including ultrasound-based sensing, including signals associated with row drivers and sense columns.

In one embodiment, the ultrasound-based sensing element includes one or more rows and one or more columns, disposed in an overlapping manner, such as rectilinearly, with the effect of identifying one or more force sensing elements at each intersection of a particular such row and a particular such column. This has the effect that force of touch can be determined independently at each particular one such force sensing element.

In one embodiment, the ultrasound-based sensing elements have their rows coupled to one or more triggering and driving circuits (such as shown in the figure as TX1 and TX2, corresponding to rows 1 and 2, respectively), each of which is coupled to a corresponding row of the ultrasound-based sensing element. Each corresponding row of the ultrasound-based sensing element is coupled to a sequence of one or more ultrasound-based sensors. Each ultrasound-based sensor can, when triggered, emit an ultrasonic pulse or other signal (such as shown in the figure as TX1 and TX1, again corresponding to rows 1 and 2, respectively), which is transmitted from the ultrasound-based sensor, through the elements described with respect to the FIG. 5A or the FIG. 5B, and to the surface of the cover glass.

The triggering and driving circuits generate one or more pulses which are transmitted to the rows of the ultrasound-based sensing device, each of which is coupled to a corresponding row of individual ultrasound-based sensing elements. Similarly, in one embodiment, the individual ultrasound-based sensing elements have their columns coupled to one or more sensing and receiving circuits, each of which is coupled to a corresponding column of the ultrasound-based sensing device. Collectively, this has the effect that one or more rows of the ultrasound-based sensing device are driven by corresponding triggering signals, which are coupled to one or more columns of the ultrasound-based sensing device, which are sensed by corresponding receiving circuits.

When the ultrasonic pulse of the ultrasound-based sensing device reaches the front surface of the cover glass, it would be reflected, at least in part, by at least the glass-to-air interface. With the user's fingertip, or other part of the user's body, or other touching element (such as a soft-ended stylus or similar device) in contact with the glass, the amount of the ultrasonic pulse that is reflected varies with the amount of force that is applied to the glass. Specifically, the user's fingertip absorbs a certain amount of the energy from the ultrasonic pulse thus reducing the energy in the reflected pulse. Further, the amount of energy absorbed by the fingertip increases as the fingertip applies a greater amount of force to the glass. Thus, as the fingertip applies a greater amount of force to the glass, a lesser amount of energy is reflected back from the glass-to-air interface. When the ultrasonic pulse that is reflected back to the ultrasound-based sensor which emitted that ultrasonic pulse, the amplitude and thus the energy of the reflected pulse can be measured. Further the amplitude of the reflected pulse can be then correlated with different amounts of force, as applied to the glass.

In one embodiment, the system can define two levels of force, such as light and medium, that are correlated with two ranges of energy in the reflected pulse. In other embodiments, the system can define three levels of force, such as light, medium and heavy, that are correlated with the three ranges of energy in the reflected pulse. It should be appreciated that these correlations are by way of example and not limitation. In accordance with other embodiments, any number of force levels may be defined as is appropriate for a particular design.

One or more such reflections from the front surface of the cover glass can be identified by the columns of the ultrasound-based sensing element (such as shown in the figure as Vout A, Vout B, and Vout C, corresponding to columns A, B, and C, respectively). Each such column is coupled to a sense amplifier, such as shown in the figure including a reference voltage Vref (such as a grounding voltage or other reference voltage), an amplifier, and a feedback impedance element (such as a capacitor, resistor, or combination or conjunction thereof, or otherwise). Although each sense amplifier is shown in the figure as coupled to only one sensing element, in the context of the invention, there is no particular requirement for any such limitation. For example, one or more such sense amplifiers can include a differential sense amplifier, or other sense amplifier design.

In one embodiment, each sense amplifier is disposed so that it generates a relatively maximal response in those cases when the ultrasonic reflection from the front of the cover glass is due to a force directly above the force sense element. This has the effect that when the force sense element receives a force of touch from the user, the relatively maximal response to that force of touch impressed on the cover glass by the user is primarily from the ultrasound-based sensing element at the individual row/column associated with the location where that force of touch is relatively maximal. To the extent that force of touch impressed on the cover glass by the user is also impressed on other locations on the cover glass, the ultrasound-based sensing element at the individual row/column associated with those other locations would also be responsive.

In one embodiment, each sense amplifier is also disposed so that it generates a relatively minimal response in those cases when the ultrasonic reflection from the front of the cover glass is due to a force from a location relatively far from directly above the force sense element. For example, in the case that the ultrasonic reflection is from a portion of the ultrasonic pulse which radiates at an angle from the ultrasound-based sensor, and is similarly reflected back at that angle, the arrival time of that ultrasonic pulse would be sufficiently different from a direct up-and-down reflection that the sense amplifier can be disposed to disregard that portion of the reflection of the ultrasonic pulse. This has the effect that the sense amplifier can be disposed to only respond to those cases when force of touch is impressed on the cover glass by the user directly above the sense amplifier.

For example, an ultrasonic pulse can be generated by a triggering pulse from a driving circuit, such as TX1 or TX2, with the effect of providing a first set of (unwanted) reflections and a second set of (wanted) reflections, one set for each of Vout A, Vout B, and Vout C. The unwanted reflections might be responsive to reflections from other ultrasonic pulses, from ultrasonic pulses that are reflected from elements other than the front of the cover glass, or otherwise. For example, the unwanted reflections might occur at a time after the triggering pulse from driving circuit, such as less than about 450 nanoseconds after the triggering pulse, but before an expected time for the ultrasonic pulse to travel to the front of the cover glass and be reflected, such as more than about 450 nanoseconds after the triggering pulse. In such cases, the receiving and sensing circuits would be disposed to decline to respond to those reflections which are not within the expected window of time duration for a response from the correct force sensing element.

In one embodiment, the touch I/O device can include a capacitive touch sensing device, which can determine a location, or an approximate location, at which the user contacts, or nearly contacts, the touch I/O device, such as in combination with the ultrasound-based sensing device. For example, the capacitive touch sensing device can include a set of capacitive touch sensors, each of which is disposed to determine if the user contacts, or nearly contacts, the touch I/O device at one or more capacitive touch sensing elements, such as in response to an row-driver electronic pulse as can be used to also drive the ultrasound-based sensing device. In such cases, the capacitive touch sensing device includes a substantially quicker signal response than the ultrasound-based sensing device, and this substantially quicker signal response can be detected by the capacitive touch sensing device outside a time window otherwise used by the ultrasound-based sensing device.

In one embodiment, the triggering pulse from a driving circuit, such as TX1 or TX2, provides a set of triggers for touch sensing elements and force sensing elements in that row. For example, a triggering pulse TX1 can provide a set of triggers in a first row for both capacitive touch sensing devices and ultrasound-based sensing devices, the former providing an activated capacitive element (such as an activated capacitive plate) and the latter providing an activated ultrasound-based sensing element (such as an activated ultrasonic pulse). In such cases, in response to a contact, or near contact, the capacitive touch sensing device would be activated relatively quickly, in general, substantially more quickly than an ultrasonic reflection would be received.

In such cases, this would have the effect that responsive signals measured at Vout A, Vout B, and Vout C would have multiple components: (A) a first component including a relatively quick response to the activated capacitive element, (B) a second component including a set of earlier, and relatively unwanted, responses to the ultrasound-based sensing device, as described above which might occur less than 450 nanoseconds after the ultrasonic pulse, and (C) a third component including a set of later, and relatively wanted, responses to the ultrasound-based sensing device, as described above which might occur more than 450 nanoseconds after the ultrasonic pulse. Each of these components can be separately filtered, with the first component of relatively quick responses being routed to the capacitive sensing device, the second component of relatively unwanted responses being discarded, and the third component of relatively wanted responses being routed to the ultrasound-based sensing device.

In one embodiment, the touch I/O device can combine information from the capacitive touch sensing device and the ultrasound-based force sensing device, with the effect of determining both a location of touch and a force of touch by the user.

In one embodiment, the touch I/O device can maintain the ultrasound-based force sensing device in a relatively dormant state, with the effect of reducing ongoing power use, until such time as the capacitive touch sensing device indicates that there is a contact or near contact by the user on the touch I/O device. For a first example, once there is a contact or near contact by the user on the touch I/O device, the touch I/O device can activate the ultrasound-based force sensing device, with the effect that the ultrasound-based force sensing device need not draw power at times while the user is not contacting the touch I/O device. For a second example, once there is a contact or near contact by the user on the touch I/O device, the touch I/O device can activate a portion of the ultrasound-based force sensing device associated with the location where the contact or near contact occurs, with the effect that only those portions of the ultrasound-based force sensing device need draw power only at locations which are associated with places where the user is contacting the touch I/O device.

Figure 9:
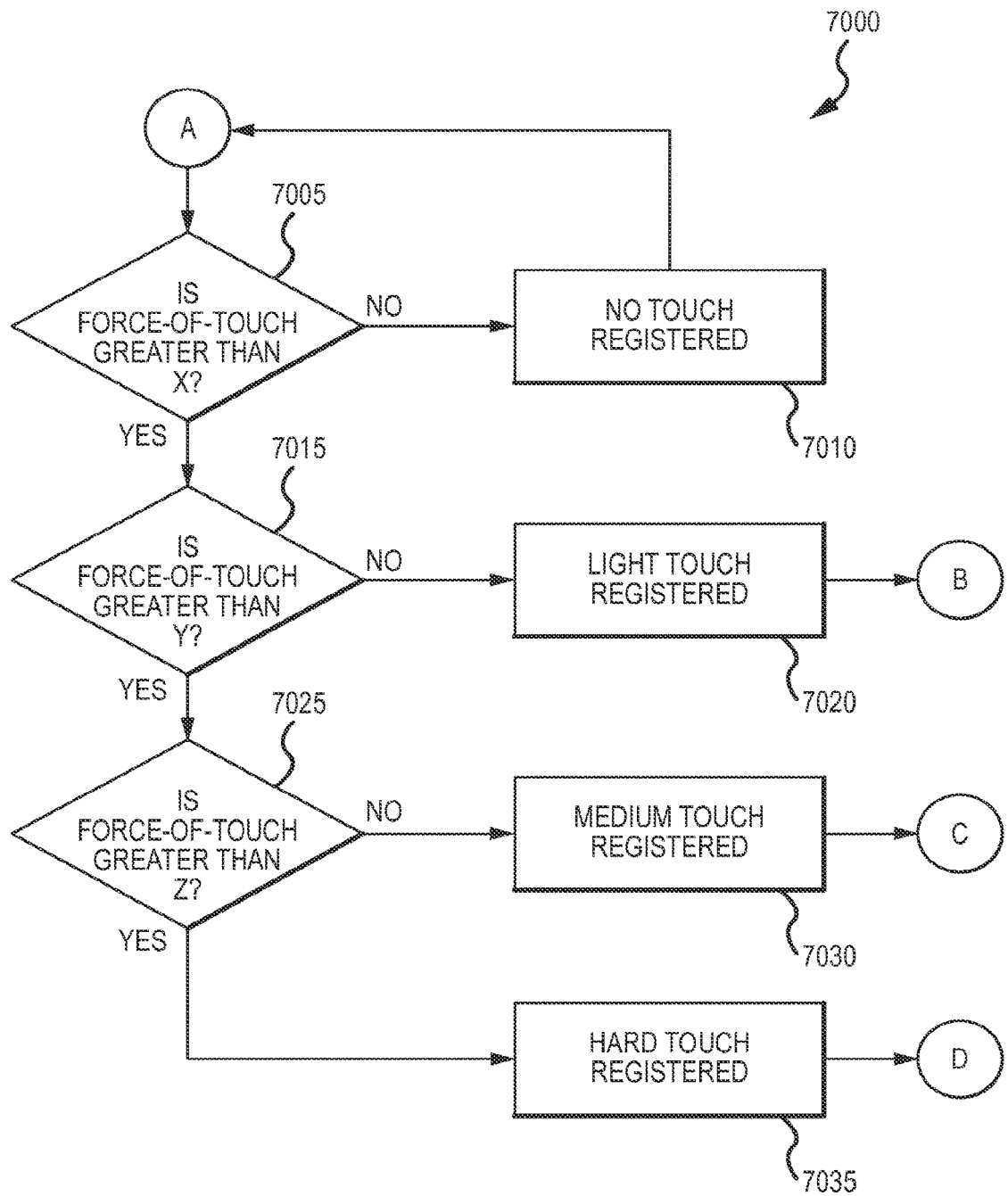
FIG. 9 is a flow chart that illustrates a method of processing touch input in accordance with embodiments discussed herein.

FIG. 9 is a flow chart that illustrates a method 7000 of processing touch input in accordance with embodiments discussed herein. The method 7000 receives a touch input and measures the force of touch input. In so doing, the method classifies the force of touch as being light, medium, or heavy.

Initially, in operation 7005, the touch processing module 2026 determines if the touch input was entered with greater than a first or "X" amount of force. If the touch input was not entered with greater than X amount of force, control may proceed to operation 7010. If the touch input was entered with a greater than X amount of force, control may proceed to operation 7015.

In operation 7010, the touch processing module 2026 executes no operation because the force of the touch was below a threshold amount that the system recognizes as a touch. Following operation 7010, control return to the A control point.

In operation 7015, the touch processing module 2026 determines if the touch input was entered with greater than a second or "Y" amount of force. If the touch input was not entered with greater than Y amount of force, control may proceed to operation 7020. If the touch input was entered with a greater than Y amount of force, control may proceed to operation 7025.

In operation 7020, the touch processing module 2026 registers a light touch. Following operation 7020, the touch processing module 2026 may execute a light touch processing sequence B. An example light touch processing sequence is described in further detail below in connection with FIG. 8.

In operation 7025, the touch processing module 2026 determines if the touch input was entered with greater than a third or "Z" amount of force. If the touch input was not entered with greater than Z amount of force, control may proceed to operation 7030. If the touch input was entered with a greater than Z amount of force, control may proceed to operation 7035.

In operation 7030, the touch processing module 2026 registers a medium touch. Following operation 7030, the touch processing module 2026 may execute a medium touch processing sequence C. An example medium touch processing sequence is described in further detail below in connection with FIG. 9

In operation 7035, the touch processing module 2026 registers a heavy touch. Following operation 7035, the touch processing module 2026 may execute a heavy touch processing sequence D. An example heavy touch processing sequence is described in further detail below in connection with FIG. 10

Figure 10:
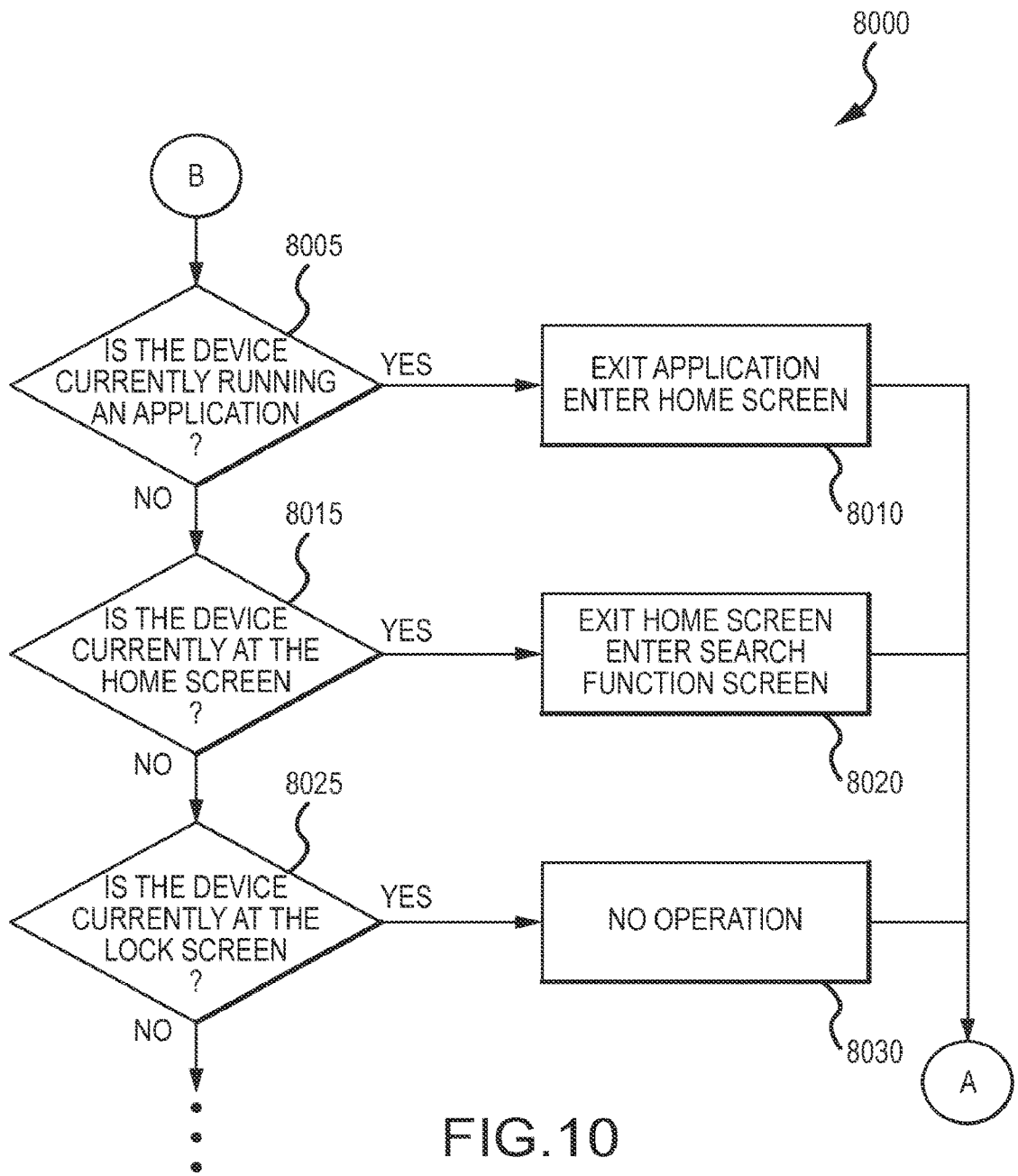
FIG. 10 is flow chart that illustrates an example light touch processing sequence in accordance with embodiments discussed herein.

FIG. 10 is flow chart that illustrates an example light touch processing sequence in accordance with embodiments discussed herein. The light touch processing sequence shown in FIG. 10 is by way of example and not limitation. It should be appreciated that other light touch processing sequences consistent with this disclosure may be implemented as appropriate in a particular design.

Initially, in operation 8005, the touch processing module 2026 determines if the electronic device is currently running an application. If the electronic device is currently running an application, control may proceed to operation 8010. If the electronic device is not currently running an application, control may proceed to operation 8015.

In operation 8010, the touch processing module 2026 exits the application and enters the home screen. Following operation 8010, control may return to the A control point.

In operation 8015, the touch processing module 2026 determines if the electronic device is currently at the home screen. If the electronic device is currently at the home screen, control may proceed to operation 8020. If the electronic device is not currently at the home screen, control may proceed to operation 8025.

In operation 8020, the touch processing module 2026 exits the home screen and enters the search function screen. Following operation 8020, control may return to the A control point.

In operation 8025, the touch processing module 2026 determines if the electronic device is currently at the lock screen. If electronic device is currently at the lock screen, control may proceed to operation 8030. If electronic device is not currently at the lock screen, control may continue with other steps in light touch processing sequence that are appropriate for modes of operation that the system may implement.

In operation 8030, the touch processing module 2026 executes no operation because a light touch received when the device is at the lock screen may merely indicate that an object brushed the surface of the device and so no meaningful touch was actually received. Following operation 8030, control may return to the A control point.

Figure 11:
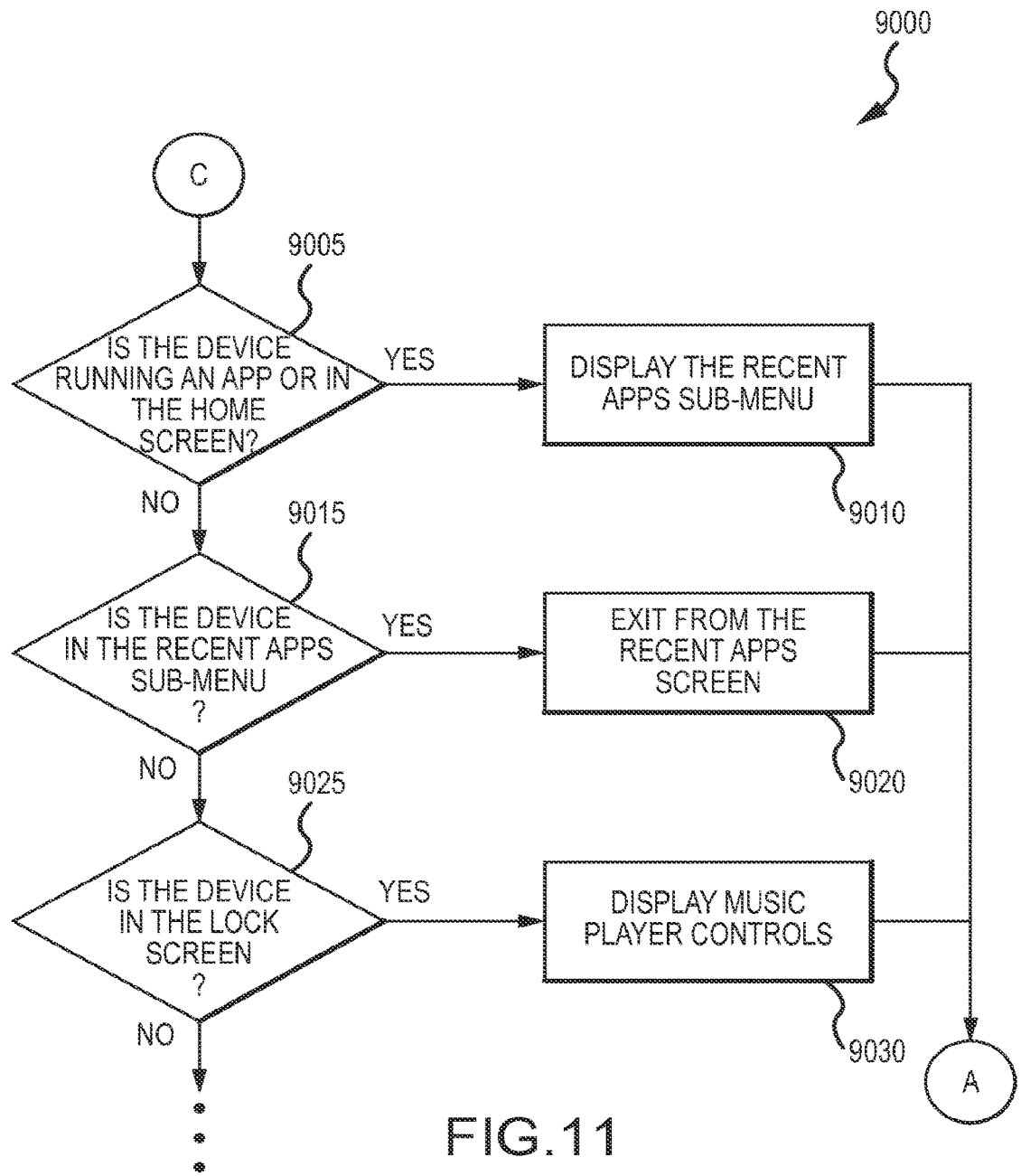
FIG. 11 is flow chart that illustrates an example medium touch processing sequence in accordance with embodiments discussed herein.

FIG. 11 is flow chart that illustrates an example medium touch processing sequence in accordance with embodiments discussed herein. The medium touch processing sequence shown in FIG. 11 is by way of example and not limitation. It should be appreciated that other medium touch processing sequences consistent with this disclosure may be implemented as appropriate in a particular design.

Initially, in operation 9005, the touch processing module 2026 determines if the electronic device is currently running an application or is at the home screen. If the electronic device is currently running an application or is at the home screen, control may proceed to operation 9010. If the electronic device is not currently running an application or at the home screen, control may proceed to operation 9015.

In operation 9010, the touch processing module 2026 displays the recent applications selector interface. Following operation 9010, control may return to the A control point.

In operation 9015, the touch processing module 2026 determines if the electronic device is currently displaying the recent applications selector interface. If the electronic device is currently displaying the recent applications selector interface, control may proceed to operation 9020. If the electronic device is not currently displaying the recent applications selector interface, control may proceed to operation 9025.

In operation 9020, the touch processing module 2026 exits the home screen and enters the search function screen. Following operation 9020, control may return to the A control point.

In operation 9025, the touch processing module 2026 determines if the electronic device is currently at the lock screen. If electronic device is currently at the lock screen, control may proceed to operation 9030. If electronic device is not currently at the lock screen, control may continue with other steps in medium touch processing sequence that are appropriate for modes of operation that the system may implement.

In operation 9030, the touch processing module 2026 display controls of the music player. Following operation 9030, control may return to the A control point.

Figure 12:
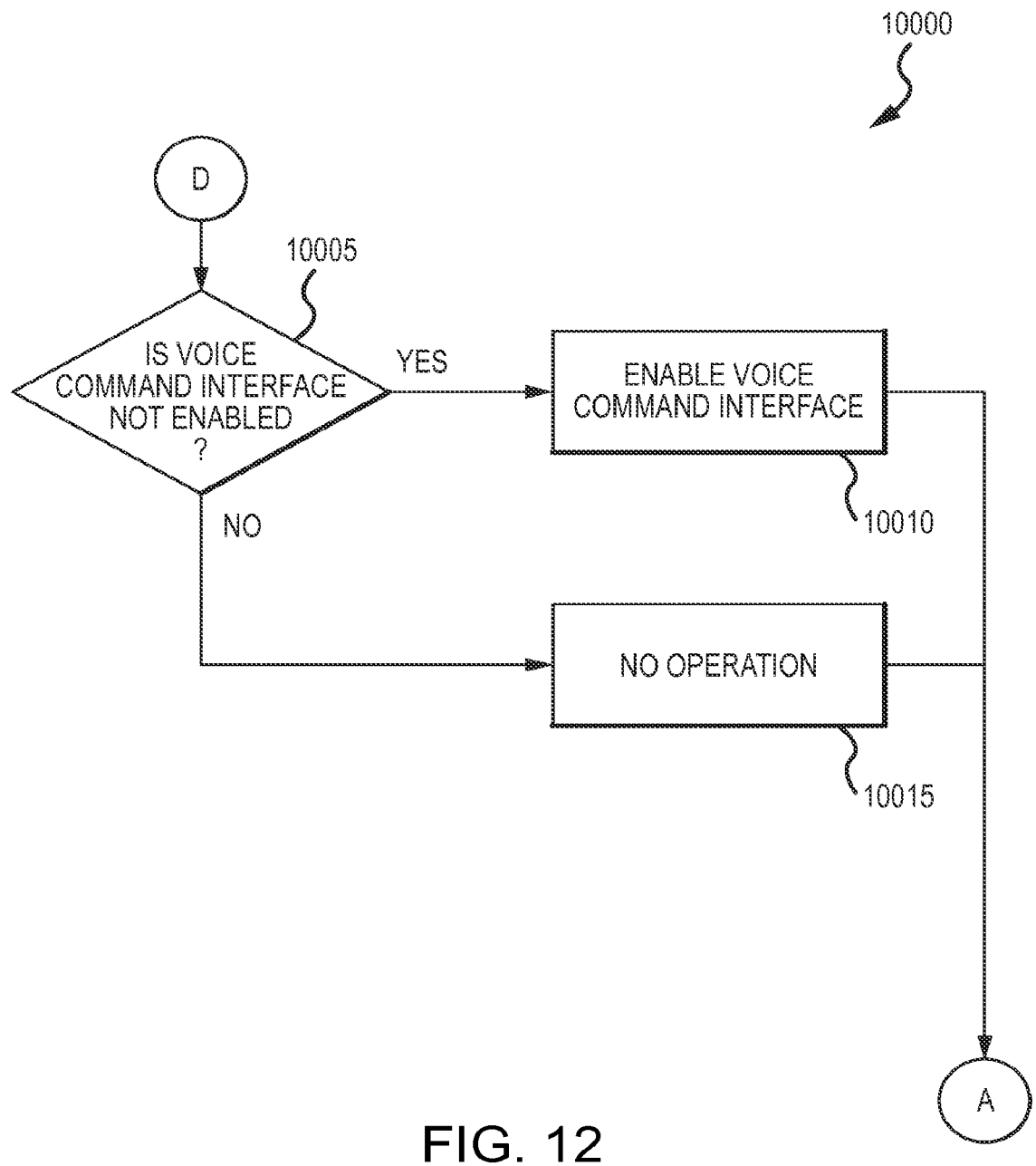
FIG. 12 is flow chart that illustrates an example heavy touch processing sequence in accordance with embodiments discussed herein.

FIG. 12 is flow chart that illustrates an example heavy touch processing sequence in accordance with embodiments discussed herein. The heavy touch processing sequence shown in FIG. 12 is by way of example and not limitation. It should be appreciated that other heavy touch processing sequences consistent with this disclosure may be implemented as appropriate in a particular design.

Initially, in operation 10005, the touch processing module 2026 determines if the voice command interface is not currently enabled. If the voice command interface is not currently enabled, control may proceed to operation 10010. If the voice command interface is currently enabled, control may proceed to operation 10015.

In operation 10010, the touch processing module 2026 enables the voice command interface. Following operation 10010, control may return to the A control point.

In operation 10015, the touch processing module 2026 executes no operation. Following operation 10015, control may return to the A control point.

Figure 13:
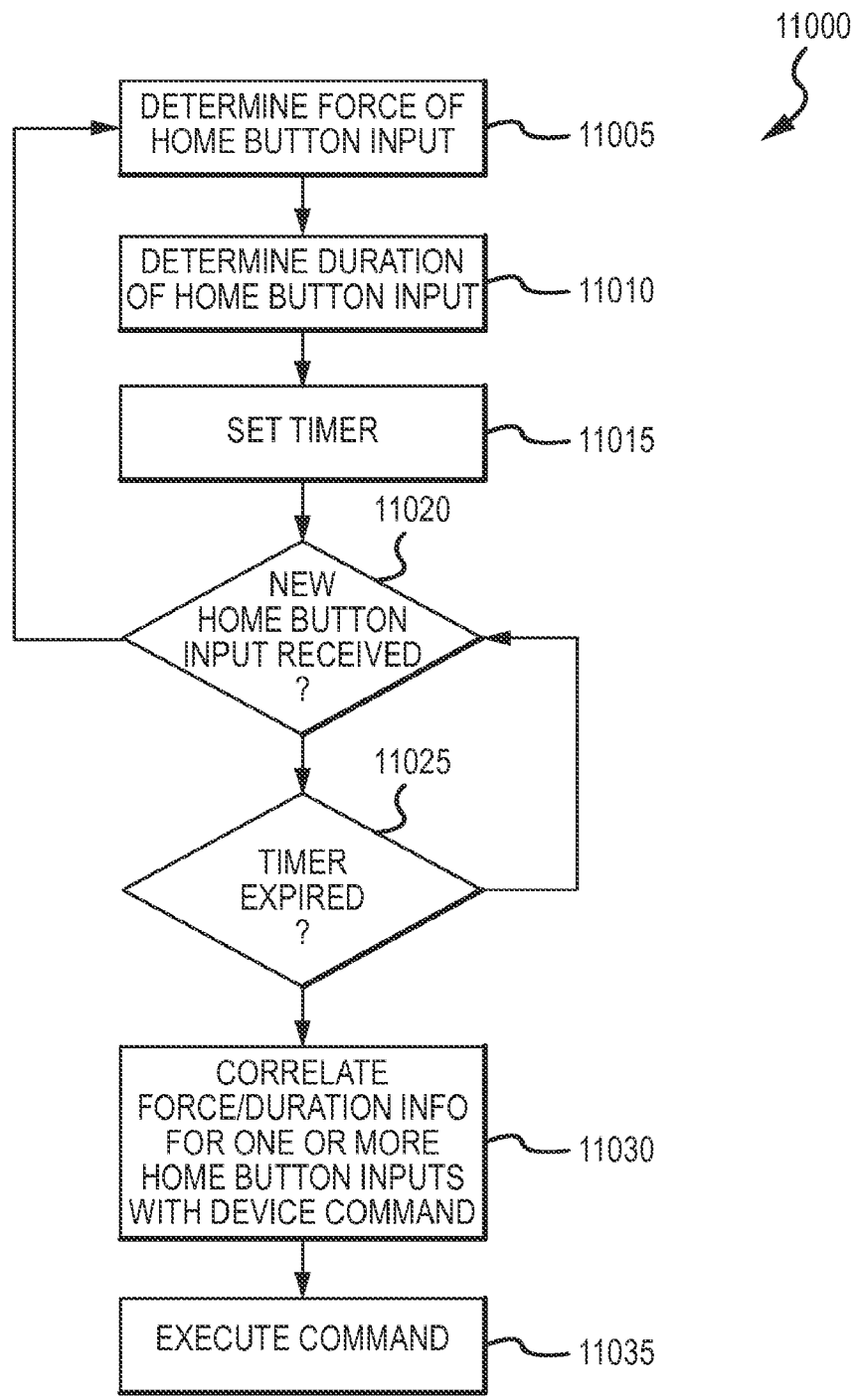
FIG. 13 is a flow chart that illustrates a method of processing touch input in accordance with embodiments discussed herein.

FIG. 13 is a flow chart that illustrates a method 11000 of processing touch input in accordance with embodiments discussed herein. The method of 11000 combines command recognition through force-of-touch sensing with other types of command recognition in order to expand the functionality of the home button.

Initially, in operation 11005, the touch processing module 2026 determines the force applied when the user pressed the home button. Following operation 11005, control may proceed to operation 11010.

In operation 11010, the touch processing module 2026 determines the duration during which the user pressed the home button. Following operation 11010, control may proceed to operation 11015.

In operation 11015, the touch processing module 2026 sets a timer. The timer tracks the time between touch inputs. If the time between inputs is sufficiently short, the system may recognized the two inputs as grouped together, indicating a particular command that is entered by entering successive touches. Following operation 11015, control may proceed to operation 11020.

In operation 11020, the touch processing module 2026 determines if the electronic device has received a further home button input. If the electronic device has received a further home button input, control may again pass to operation 11005. If the electronic device has not received a further home button input, control may proceed to operation 11025.

In operation 11025, the touch processing module 2026 determines if the timer has expired. If the timer has not expired, control may again pass to operation 11020. If the timer has expired, control may proceed to operation 11030.

In operation 11030, the touch processing module 2026 correlates force and duration information for one or more home-button inputs with an appropriate command. Following operation 11030, the electronic device executes the command in operation 11035.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

Figure 14A:
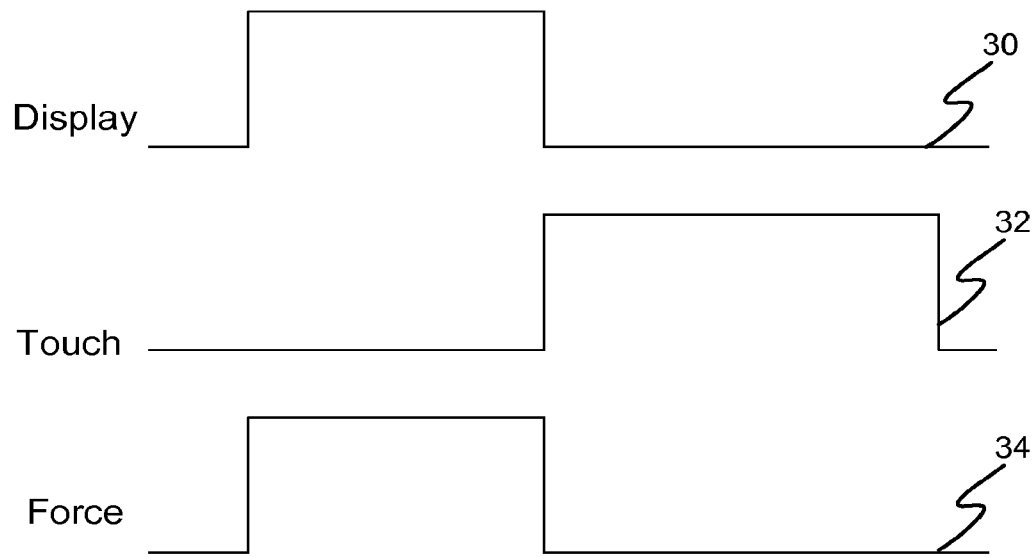
FIG. 14A is a first example of a timing diagram for the computing device.
Figure 14B:
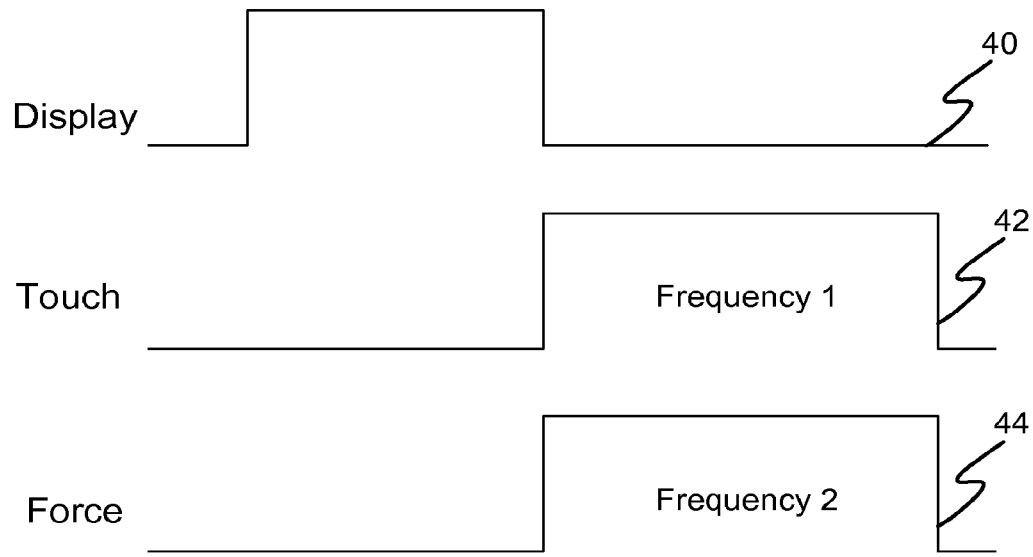
FIG. 14B is a second example of a timing diagram for the computing device.
Figure 14C:
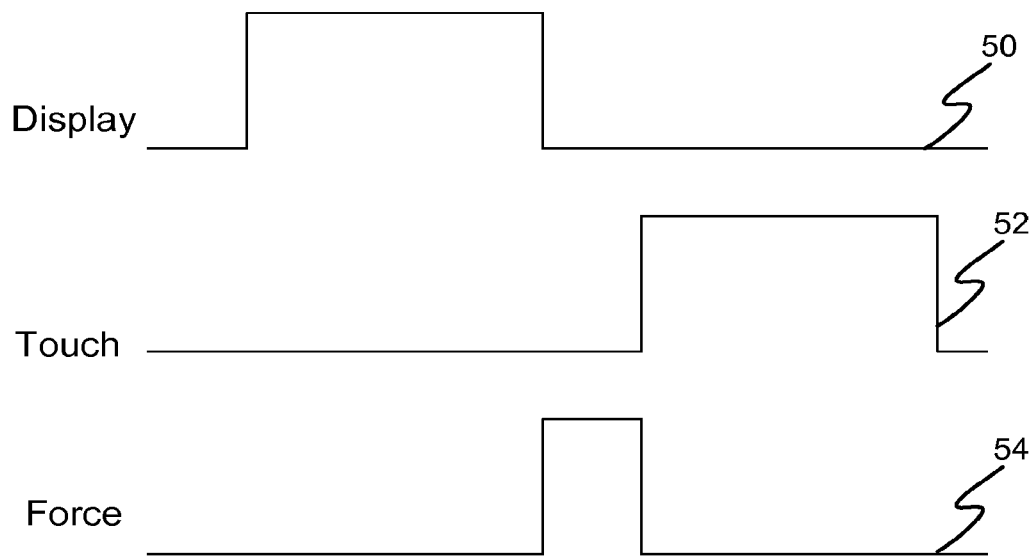
FIG. 14C is a third example of a timing diagram for the computing device.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow Timing Diagram In some embodiments various components of the computing device and/or touch screen device may be driven or activated separately from each other and/or on separate frequencies. Separate drive times and/or frequencies for certain components, such as the display, touch sensor or sensors (if any), and/or force sensors may help to reduce cross-talk and noise in various components. FIGS. 14A-14C illustrate different timing diagram examples, each will be discussed in turn below. It should be noted that the timing diagrams discussed herein are meant as illustrative only and many other timing diagrams and driving schemes are envisioned.

With respect to FIG. 14A, in some embodiments, the display 14 and the force sensor 18 may be driven substantially simultaneously, with the touch sensitive component 1001 being driven separately. In other words, the driver circuits for the force sensing device 18 may be activated during a time period that the display is also activated. For example, the display signal 30 and the force sensing signal 34 may both be on during a first time period and then may both inactive as the touch sensing device signal 32 is activated.

With respect to FIG. 14B, in some embodiments, the touch and force devices may be driven at substantially the same time and the display may be driven separately. For example, the display signal 40 may be set high (e.g., active) during a time that the touch signal 42 and the force signal 44 may both be low (e.g., inactive), and the display signal 40 may be low while both the touch signal 42 and the force signal 44 are high. In this example, the touch signal 42 and the force signal 44 may have different frequencies. In particular, the touch signal 42 may have a first frequency F1 and the force signal 44 may have a second frequency F2. By utilizing separate frequencies F1 and F2, the computing device may be able to sample both touch inputs and force inputs at substantially the same time without one interfering with the other, which in turn may allow the processor to better correlate the touch inputs and the force inputs. In other words, the processor may be able to correlate a force input to a touch input because the sensors may be sampling at substantially the same time as one another. Additionally, the separate frequencies may reduce noise and cross-talk between the two sensors. Although the example in FIG. 14B is discussed with respect to the force and touch signals, in other embodiments each of the drive signal, the touch signal, and/or the force signal may have separate frequencies from each other and may be activated simultaneously or correspondingly with another signal.

With respect to FIG. 14C, in some embodiments, various components in the computing device may be driven separately from one another. For example, the display signal 50 may be driven high, while both the touch signal 52 and the force signal 54 are low. Additionally, the touch signal 52 may be high while both the force signal 54 and the display signal 50 are low and similarly the force signal 54 may be high while both the display signal 50 and the touch signal 52 are low. In these examples, the force signal's active period may be positioned between the active periods of the display and the touch sensor. In other words, the force sensor 18 may be driven between the display being driven and the touch sensors being driven. In these examples, each of the devices may be active at separate times from one another, thereby reducing inter-system noise. In some embodiments, the force sensor may have a shorter drive time than the display or touch signals; however, in other embodiments, the force sensor may have a drive time that is substantially the same as or longer than the display and/or touch sensor.

CONCLUSION

Although embodiments have been fully described with reference to the accompanying drawings, it is to be noted that various changes and modifications will become apparent to those skilled in the art. Such changes and modifications are to be understood as being included within the scope of the various embodiments as defined by the appended claims. The foregoing description has broad application. Accordingly, the discussion of any embodiment is meant only to be an example and is not intended to suggest that the scope of the disclosure, including the claims, is limited to these examples.

What is claimed is:

1. A force-sensitive device, comprising:
   a non-mechanical, non-depressible button;
   an ultrasound-based force-sensing element underlying the button with respect to a bottom surface of the device, the force-sensing element comprising:
   at least one emitter operative to transmit an energy pulse toward a surface of the button; and
   at least one receiver configured to receive a reflected energy pulse from the surface of the button;
   a sensing layer configured to detect a location of a touch on the force-sensitive device; and
   a processor operative to receive force data based on the touch from the force-sensing element and interpret the force data as a command associated with the button;
   wherein
   the reflected energy pulse is indicative of the force data;
   based on a first magnitude of force, the command comprises a first command; and
   based on a second magnitude of force different from the first magnitude of force, the command comprises a second command.

2. The force-sensitive device of claim 1, wherein the button is indicated by an image rendered by a display.

3. The force-sensitive device of claim 1, wherein:
   the at least one receiver is operatively coupled to the processor and configured to transmit a signal to the processor corresponding to the reflected energy pulse.

4. The force-sensitive device of claim 3, wherein the processor is operative to determine an estimate of force applied to the button based at least in part on the reflected energy pulse.

5. The force-sensitive device of claim 1, wherein the button comprises an icon positioned within a black mask of a display.

6. The force-sensitive device of claim 1, wherein the sensing layer is positioned beneath the button.

7. The force-sensitive device of claim 6, wherein the sensing layer is formed from di-titanium oxide.

8. The force-sensitive device of claim 1, further comprising a display configured to depict the button, the display positioned above the force-sensing element with respect to a bottom surface of the device.

9. The force-sensitive device of claim 8, wherein the display is configured to provide feedback in response to a sensed force.

10. A method for determining and responding to an input force, comprising:
    ultrasonically sensing a force exerted on a button or a touch screen of an electronic device, the button or the touch screen being non-depressible and non-mechanical, by:
    transmitting an energy pulse toward a bottom surface of the button or the touch screen; and
    receiving a reflected energy pulse from the bottom surface of the button or the touch screen;
    determining a magnitude of the force based on the reflected energy pulse;

correlating the force to an input command, the correlated input command chosen from three or more input commands based on the magnitude of the force exerted on the button or the touch screen; and executing the correlated input command.

11. The method of claim 10, further comprising:

determining a duration during which the force is exerted on the button or the touch screen of the electronic device; and choosing the correlated input command from the three or more input commands is based on both the duration and the magnitude of the force.

12. The method of claim 11, wherein:

the force is a first force; and the method further comprises:
- setting a timer in response to sensing the first force exerted on the button or the touch screen of the electronic device;
- determining that a second force is exerted on the button or the touch screen during the duration of the timer; and
- in response to determining that the second force is exerted on the button or the touch screen during the duration of the timer, ignoring the first force.

13. The method of claim 11, wherein:

the force is a first force; and the method further comprises:
- setting a timer in response to sensing the first force exerted on the button or the touch screen of the electronic device;
- determining that a second force is exerted on the button or the touch screen during the duration of the timer; and
- in response to determining that the second force is exerted on the button or the touch screen during the duration of the timer, correlating both the first force and the second force to the input command.

14. An electronic device, comprising:

a touch-sensitive display;

a non-mechanical, non-depressible button;

an ultrasound-based force-sensing element positioned below the button and configured to detect force data indicating an amount of force applied to the button, the force-sensing element comprising:
- an emitter operative to transmit an ultrasonic pulse toward a surface of the display;
- a receiver configured to receive a reflected ultrasonic pulse indicative of the force data; and a processor operative to:
- receive the force data and estimate the amount of force;
- execute a first command in response to the amount of force equaling or exceeding a first threshold; and
- execute a second command in response to the amount of force equaling or exceeding a second threshold greater than the first threshold.

15. The electronic device of claim 14, wherein the button comprises an image rendered by the display.

16. The electronic device of claim 14, wherein the receiver is operatively coupled to the processor and configured to transmit a signal to the processor corresponding to the reflected energy pulse.

17. The electronic device of claim 16, wherein the processor is operative to determine the estimate of force applied to the button based at least in part on the reflected energy pulse.

18. The electronic device of claim 14, wherein the button is positioned within a border adjacent the display.

19. The electronic device of claim 14, wherein the processor is further configured to:

execute a third command in response to the amount of force equaling or exceeding a third threshold greater than the second threshold.

20. The electronic device of claim 14, wherein the processor is further configured to:

determine a duration during which the force is exerted; and vary the first command or the second command based on both the duration of the force and the amount of force.

* * * * *